(12) United States Patent
Isozaki et al.

(10) Patent No.: US 7,188,245 B2
(45) Date of Patent: Mar. 6, 2007

(54) CONTENTS TRANSMISSION/RECEPTION SCHEME WITH FUNCTION FOR LIMITING RECIPIENTS

(75) Inventors: Hiroshi Isozaki, Kawasaki (JP); Takeshi Ishihara, Yokohama (JP); Yasuyuki Kozakai, Yokohama (JP); Takeshi Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 10/729,964

(22) Filed: Dec. 9, 2003

(65) Prior Publication Data

US 2004/0168062 A1 Aug. 26, 2004

(30) Foreign Application Priority Data

Dec. 9, 2002 (JP) ............................. 2002-357168

(51) Int. Cl.
*G06F 3/00* (2006.01)

(52) U.S. Cl. .................................................. 713/171
(58) Field of Classification Search .................. 726/2, 726/3, 4, 29, 5; 713/171, 168
See application file for complete search history.

(56) References Cited

U.S. PATENT DOCUMENTS

| | | | | |
|---|---|---|---|---|
| 5,210,748 A | * | 5/1993 | Onishi et al. | 370/405 |
| 5,608,871 A | * | 3/1997 | Murono | 709/249 |
| 5,732,071 A | * | 3/1998 | Saito et al. | 370/255 |
| 6,101,182 A | * | 8/2000 | Sistanizadeh et al. | 370/352 |
| 6,292,838 B1 | * | 9/2001 | Nelson | 709/236 |
| 6,393,484 B1 | * | 5/2002 | Massarani | 709/227 |
| 6,424,650 B1 | * | 7/2002 | Yang et al. | 370/390 |
| 6,603,758 B1 | * | 8/2003 | Schmuelling et al. | 370/352 |
| 6,693,878 B1 | * | 2/2004 | Daruwalla et al. | 370/235 |
| 6,826,690 B1 | * | 11/2004 | Hind et al. | 713/186 |
| 6,829,250 B2 | * | 12/2004 | Voit et al. | 370/467 |
| 2001/0048687 A1 | * | 12/2001 | Coden | 370/403 |
| 2002/0044567 A1 | * | 4/2002 | Voit et al. | 370/467 |
| 2002/0147826 A1 | * | 10/2002 | Sultan | 709/230 |
| 2004/0168062 A1 | | 8/2004 | Isozaki et al. | |

FOREIGN PATENT DOCUMENTS

JP 2001-285284 10/2001

OTHER PUBLICATIONS

U.S. Appl. No. 09/404,547, filed Sep. 24, 1999, Saito et al.
U.S. Appl. No. 09/539,319, filed Mar. 30, 2000, Saito et al.
U.S. Appl. No. 09/934,674, filed Aug. 23, 2001, Saito.
U.S. Appl. No. 10/352,128, filed Jan. 28, 2003, Saito et al.

(Continued)

*Primary Examiner*—Eric Coleman
(74) *Attorney, Agent, or Firm*—Oblon, Spivak, McClelland, Maier & Neustadt, P.C.

(57) ABSTRACT

In a contents transmission/reception system, the transmission of the contents to the corresponding reception device is permitted only in the case where the device identification information searched out by the device identification information search unit and the device identification information registered by the device identification information registration unit coincide, so that it is possible to provide the contents only to the limited reception devices, and it is possible to prevent the illegal reception of the contents.

15 Claims, 21 Drawing Sheets

OTHER PUBLICATIONS

U.S. Appl. No. 10/615,768, filed Jul. 10, 2003, Nakakita et al.
U.S. Appl. No. 10/722,515, filed Nov. 28, 2003, Saito et al.
U.S. Appl. No. 10/722,468, filed Nov. 28, 2003, Saito et al.
U.S. Appl. No. 10/729,964, filed Dec. 9, 2003, Isozaki et al.
U.S. Appl. No. 10/782,896, filed Feb. 23, 2004, Saito et al.
U.S. Appl. No. 10/876,705, filed Jun. 28, 2004, Saito et al.
U.S. Appl. No. 11/130,135, filed May 17, 2005, Isozaki et al.

* cited by examiner

MAC ADDRESS TABLE

|  | IP ADDRESS | MAC ADDRESS | DEVICE ID |
|---|---|---|---|
| SINK DEVICE B | 192.168.1.3 | BB:BB:BB | B1 |
| SINK DEVICE C | 192.168.1.5 | CC:CC:CC | C1 |
| SINK DEVICE X | 192.168.78 | XX:XX:XX | X1 |
| ......... | | | |

CONTENTS TRANSMISSION/RECEPTION SCHEME WITH FUNCTION FOR LIMITING RECIPIENTS

BACKGROUND OF THE INVENTION

1. Field of the Invention

The present Invention relates to a contents transmission/reception system, a contents transmission device, a contents reception device, and a contents transmission/reception method for transmitting/receiving contents from a transmission device to a reception device.

2. Description of the Related Art

In conjunction with the spread and digitalization of computer networks in recent years, the products called digital information home electronics are becoming popular. Also, in conjunction with the start of the ground based digital broadcasting, it is expected that the digital broadcasting compatible TV, set-top box, DVD recorder, etc. will become more popular in the future. It is convenient for the users to connect these digital home electronics through networks.

The digital contents have an advantage that they can be easily copied without causing any the degradation in their quality, but they also require measures concerning the copyright of the contents.

FIG. 33 shows an overall configuration of a conventional network system having a transmission device and a reception device. As shown in FIG. 33, a transmission device 1 (referred hereafter as a source device B) is connected to a local area network 2 such as the Ethernet. The source device B 1, a reception device 4 (referred hereafter as a sink device A), and a router device C 5 are connected to an Ethernet segment A 3 of this local area network 2. A sink device D 7 is connected to the router device C 5 through the Internet 6. The sink device A 4 receives contents from the source device B 1 through the local area network 2. On the other hand, the sink device D 7 is located within a range in which communications with the source device B 1 through the Internet 6 and the router device C 5 are possible.

Here, the contents indicate digital contents such as video data and audio data such as MPEG4 data and documents such as text data and image data, for example. Here, for the sake of explanation, the digital contents to be transferred after applying the copyright protection (which will be simply referred to as contents) will be considered.

Now, consider the case of transmitting contents from the source device B 1 to the sink device A 4 and the sink device D 7. At this point, it is necessary to account for the copyright of the contents. As described above, a range for exchanging this contents should preferably be limited to a certain range, such as a range of a legitimate right such as a range of a personal use or a range narrower than that, for example, such that the contents cannot be exchanged between others beyond that range.

In order to realize the copyright protection, the following rules will be used regarding the contents transfer in the network system of FIG. 33.

(1) The transmission/reception of contents that require the copyright protection is permitted within the local area network. This is because exchanges among devices connected to the local area network can be regarded as communications within a range of personal or family entertainment.

(2) The transmission/reception of contents that require the copyright protection is not permitted outside the local area network. The communications outside the local area network indicate open communications through the public network such as the Internet or the telephone network, as in the communications between the source device B 1 and the sink device D 7 shown in FIG. 33, for example. This is because the communications that are not closed within the local area network cannot be regarded as communications within a range of personal or family entertainment.

Note that, in the following, the exemplary case of using the Ethernet as the local area network and using IP (Internet protocol) for transmission/reception of contents at an upper layer will be described. See documents disclosed at "http://www.ietf.org" for details regarding IP, for example. Of course, it is also possible to use the other protocols, as in the case where the local area network is the IEEE 1394 and the upper layer protocol is the IP over 1394 which emulates the IP.

One method for limiting the contents distribution range to a range of personal entertainment is a method for permitting communications only within the identical local area network. In order to realize this, methods proposed conventionally include (1) a method for carrying-out AKE (Authentication and Key Exchange) by using Ethernet frames (Japanese Patent Application Laid Open No. 2002-19135), and (2) a method for checking whether the network address of the transmission device and the reception device are identical or not (Japanese Patent Application Laid Open No. 2001-285284). Besides these, there are also (3) a method for transmitting IP packets by setting TTL (Time To Live) equal to one, and (4) a combination of the above described methods.

A method combining the methods (2) and (3) will be described as an exemplary method for limiting the transmission/reception of contents from the source device B 1 to sink devices within an identical Ethernet segment in an environment shown in FIG. 34.

In general, in the IP, a plurality of devices can be regarded as belonging to the identical Ethernet segment if they have the same network address, so that it is possible to regard that the source device B 1 and the sink device are connected to the identical local area network by checking that they have the same network address. This method is shown in FIG. 35.

As shown in FIG. 35, the network address A of the sink device is registered into the source device in advance (step S21). At a time of the transmission/reception of the contents, the source device compares its own network address with the network address of the sink device (steps S22, S23), and if they coincide, they are regarded as existing in the identical local area network (step S24) and the transmission of the contents is carried out. At this point, the TTL field of the packet destined to the sink device may be set equal to one (step S25). If they do not coincide, the contents transmission/reception processing is interrupted (step S26). Note that the comparison processing is carried out by the source device in this example, but the comparison processing may be carried out by the sink device instead.

However, it is possible to circumvent the above described limitation to the identical local area network based on the network address comparison, by making appropriate settings in the source device and the sink device such that it appears as if the source device and the sink device are virtually existing in the identical sub-net even if the source device and the sink device are not physically connected to the identical local area network.

One example of such cases is the VPN (Virtual Private Network), which is a generic term for indicating techniques for making a computer at a remote location to appear as if it is connected to the local area network by constructing a network virtually, as a computer at a remote location which is connected to the Internet or an access point such as a router carries out communications with a computer connected to the local area network.

The examples of the VPN include L2TP, PPTP and IPSec. Here, the exemplary case of L2TP will be described. Note that the standardization of L2TP, PPTP and IPSec is in progress by the IETF, and details can be found in documents disclosed at "http://www.Ietf.or".

FIG. 36 shows an exemplary network configuration using the VPN. As shown in FIG. 36, a source device B 1, a sink device C 9, and a VPN server device D 60 are physically connected to an Ethernet segment A 3, and they have the identical network address so as to constitute the local area network Z 61. Also, a sink device A 4 and a router device E 5 have the identical network address so as to constitute the local area network Y.

The VPN server device D 60 is provided with a router function and connected to the Internet 8. The sink device A 4 is assigned with a global IP address and connected to the VPN server device D 60 via the Internet 6 by using the VPN client function so as to constitute a virtual network X, such that the sink device A 4 is connected to this virtual network X. Here, what is important is that the sink device A 4 is connected by the VPN so that the same network address as the source device B and the sink device C 9 is assigned virtually to the sink device A 4.

Now, at a time of transmitting contents from the source device B 1 to the sink device A 4, suppose that the above described distribution range limiting method based on the network address comparison is applied.

The sink device A 4 has the identical network address as the source device B 1 so that the network addresses will coincide. As long as the sink device A 4 is connected to the Internet 6, regardless of its location in the world, the source device B 1 can transmit the contents to the sink device A 4.

Also, even if the source device B 1 transmits the IP packet by setting TTL=1 to the sink device A 4, the value of the TTL can be easily changed, so that the packet can reach the sink device A 4 if a device for changing the value of the TTL is placed somewhere between the VPN server device D 60 and the source device B 1.

This implies that there can be cases where even if the sub-net addresses of the source device B 1 and the sink device A 4 are identical, these devices may not necessarily be existing physically in the identical local area network (the Ethernet segment in this example).

BRIEF SUMMARY OF THE INVENTION

It is therefore an object of the present invention to provide a contents transmission/reception system, a contents transmission device, a contents reception device, and a contents transmission/reception method capable of transmitting contents only to limited reception devices.

According to one aspect of the present invention there is provided a contents transmission/reception system, comprising: a transmission device; and at least one reception device that receives contents from the transmission device; wherein the transmission device has: an authentication and key exchange processing unit configured to carry out an authentication and key exchange processing with a reception device that made a contents transmission request; a device identification information transmission request unit configured to transmit a device identification information request to the reception device, such that the reception device transmits a device identification information; a device identification information registration unit configured to register the device identification information transmitted from the reception device; a device identification information search unit configured to search out the device identification information corresponding to an IP (Internet Protocol) address or the reception device, from a network to which the reception device is connected; a comparison judgement unit configured to judge whether the device identification information searched out by the device identification information search unit and the device identification information registered by the device identification information registration unit coincide or not; and a distribution condition determination unit configured to change a distribution condition for contents to be transmitted to the reception device that made the contents transmission request, according to a judgement result obtained by the comparison judgement unit; and the reception device has; a contents transmission request unit configured to make the contents transmission request to the transmission device; and a device identification information transmission unit configured to transmit the device identification information of the reception device to the transmission device, upon receiving the device identification information request from the transmission device.

According to another aspect of the present invention there is provided a contents transmission device for transmitting contents to at least one reception device, the contents transmission device comprising: an authentication and key exchange processing unit configured to carry out an authentication and key exchange processing with a reception device that made a contents transmission request; a device identification information transmission request unit configured to transmit a device identification information request to the reception device, such that the reception device transmits a device identification information; a device identification information registration unit configured to register the device identification information transmitted from the reception device; a device identification information search unit configured to search out the device identification information corresponding to an IP (Internet Protocol) address of the reception device, from a network to which the reception device is connected; a comparison judgement unit configured to judge whether the device identification information searched out by the device identification information search unit and the device identification information registered by the device identification information registration unit coincide or not: and a distribution condition determination unit configured to change a distribution condition for contents to be transmitted to the reception device that made the contents transmission request, according to a judgement result obtained by the comparison judgement unit.

According to another aspect of the present invention there is provided a contents transmission/reception system, comprising: a transmission device: and at least one reception device that receives contents from the transmission device; wherein a reception device has: a contents transmission request unit configured to make a contents transmission request to the transmission device: a first authentication and key exchange processing unit configured to carry out an authentication and key exchange processing with the transmission device to which the contents transmission request is made; a device identification information transmission request unit configured to transmit a device identification information request to the transmission device, such that the transmission device transmits a device identification information: a device identification information registration unit configured to register the device identification information transmitted from the transmission device: a device identification information search unit configured to search out the device identification information corresponding to an IP (Internet Protocol) address of the transmission device, from a network to which the transmission device is connected; a comparison judgement unit configured to judge whether the device identification information searched out by the device identification information search unit and the device identification information registered by the device identification information registration unit coincide or not; and a reception condition determination unit configured to determine a reception condition for contents to be transmitted from the transmission device to which the contents transmission request is made, according to a judgement result obtained by the comparison judgement unit; and the transmission device has: a device identification information transmission unit configured to transmit the device identification information of the transmission device to the reception device, upon receiving the device identification information request from the reception device; a second authentication and key exchange processing unit configured to carry out an authentication and key exchange processing with the reception device that made the contents transmission request; and a contents transmission control unit configured to carry out contents transmission control according to the reception condition determined by the reception condition determination unit.

According to another aspect of the present invention there is provided a contents reception device for receiving contents from a transmission device, the contents reception device comprising: a contents transmission request unit configured to make a contents transmission request to the transmission device; an authentication and key exchange processing unit configured to carry out an authentication and key exchange processing with the transmission device to which the contents transmission request is made; a device identification information transmission request unit configured to transmit a device identification information request to the transmission device, such that the transmission device transmits a device identification information; a device identification information registration unit configured to register the device identification information transmitted from the transmission device; a device identification information search unit configured to search out the device identification information corresponding to an IP (Internet Protocol) address of the transmission device, from a network to which the transmission device is connected; a comparison judgement unit configured to judge whether the device identification information searched out by the device identification information search unit and the device identification information registered by the device identification information registration unit coincide or not; and a reception condition determination unit configured to determine a reception condition for contents to be transmitted from the transmission device to which the contents transmission request is made, according to a judgement result obtained by the comparison judgement unit.

According to another aspect of the present invention there is provided a contents transmission/reception system, comprising: a transmission device; and at least one reception device that receives contents from the transmission device; wherein the transmission device has; a device identification information transmission request unit configured to transmit a device identification information request to a reception device that made a contents transmission request, such that the reception device transmits a device identification information; a device identification information registration unit configured to register the device identification information transmitted from the reception device; an advance notice unit configured to make a device identification information search advance notice, to the reception device; a device identification information search unit configured to search out the device identification information corresponding to an IP (Internet Protocol) address of the reception device, from a network to which the reception device is connected; a comparison judgement unit configured to judge whether the device identification information searched out by the device identification information search unit and the device identification information registered by the device identification information registration unit coincide or not; a request response reception judgement unit configured to judge whether a response to the device identification information search advance notice is received or not; and a distribution condition determination unit configured to determine a distribution condition for contents to be transmitted to the reception device that made the contents transmission request, according to judgement results obtained by the comparison judgement unit and the request response reception judgement unit; and the reception device has; a device information transmission unit configured to transmit the device identification information of the reception device and a device identification information search advance notice response to the transmission device, upon receiving the device identification information request from the transmission device.

According to another aspect of the present invention there is provided a contents transmission device for transmitting contents to at least one reception device, the contents transmission device comprising: a device identification information transmission request unit configured to transmit a device identification information request to a reception device that made a contents transmission request, such that the reception device transmits a device identification information; a device identification information registration unit configured to register the device identification information transmitted from the reception device; an advance notice unit configured to make a device identification information search advance notice, to the reception device; a device identification information search unit configured to search out the device identification information corresponding to an IP (Internet Protocol) address of the reception device, from a network to which the reception device is connected; a comparison judgement unit configured to judge whether the device identification information searched out by the device identification information search unit and the device identification information registered by the device identification information registration unit coincide or not; a request response reception judgement unit configured to judge whether a response to the device identification information search advance notice is received or not; and a distribution condition determination unit configured to determine a distribution condition for contents to be transmitted to the reception device that made the contents transmission request, according to judgement results obtained by the comparison judgement unit and the request response reception judgement unit.

According to another aspect of the present invention there is provided a contents transmission/reception system, comprising: a transmission device; and at least one reception device that receives contents from the transmission device; wherein the transmission device has; a device identification information search judgement unit configured to judge whether a device identification information search request from a reception device is received or not; and a contents transmission control unit configured to prohibit transmission of contents to the reception device when the device identification information search judgement unit judges that the device identification information search request is not received; and the reception device has; a contents transmission request unit configured to make a contents transmission request to the transmission device; an authentication and key exchange processing unit configured to carry out an authentication and key exchange processing with the transmission device to which the contents transmission request is made; a device identification information transmission request unit configured to transmit the device identification information request to the transmission device, such that the transmission device transmits a device identification information; a device identification information registration unit configured to register the device identification information transmitted from the reception device; an advance notice unit configured to make a device identification information search advance notice, to the transmission device; a device identification information search unit configured to search out the device identification information corresponding to an IP (Internet Protocol) address of the transmission device, from a network to which the transmission device is connected; a comparison judgement unit configured to judge whether the device identification information searched out by the device identification information search unit and the device identification information registered by the device identification information registration unit coincide or not; and a reception condition determination unit configured to determine a reception condition for contents to be transmitted from the transmission device to which the contents transmission request is made, according to a judgement result obtained by the comparison judgement unit.

According to another aspect of the present invention there is provided a contents reception device for receiving contents from a transmission device, the contents reception device comprising: a contents transmission request unit configured to make a contents transmission request to the transmission device; an authentication and key exchange processing unit configured to carry out an authentication and key exchange processing with the transmission device to which the contents transmission request is made; a device identification information transmission request unit configured to transmit the device identification information request to the transmission device, such that the transmission device transmits a device identification information; a device identification information registration unit configured to register the device identification information transmitted from the reception device; an advance notice unit configured to make a device identification information search advance notice, to the transmission device; a device identification information search unit configured to search out the device identification information corresponding to an IP (Internet Protocol) address of the transmission device, from a network to which the transmission device is connected; a comparison judgement unit configured to judge whether the device identification information searched out by the device identification information search unit and the device identification information registered by the device identification information registration unit coincide or not; and a reception condition determination unit configured to determine a reception condition for contents to be transmitted from the transmission device to which the contents transmission request is made, according to a judgement result obtained by the comparison judgement unit.

Other features and advantages of the present invention will become apparent from the following description taken in conjunction with the accompanying drawings.

DETAILED DESCRIPTION OF THE INVENTION

Referring now to FIG. 1 to FIG. 32, embodiments of the contents transmission/reception system according to the present invention will be described in detail. In the following, the Ethernet is used as an exemplary physical network, and the IP is used as an exemplary upper layer protocol. Of course, it is also possible to use the other protocols, as in the case where the local area network is the IEEE 1394 and the upper layer protocol is the IP over 1394 which emulates the IP.

(First Embodiment)

Figure 1:
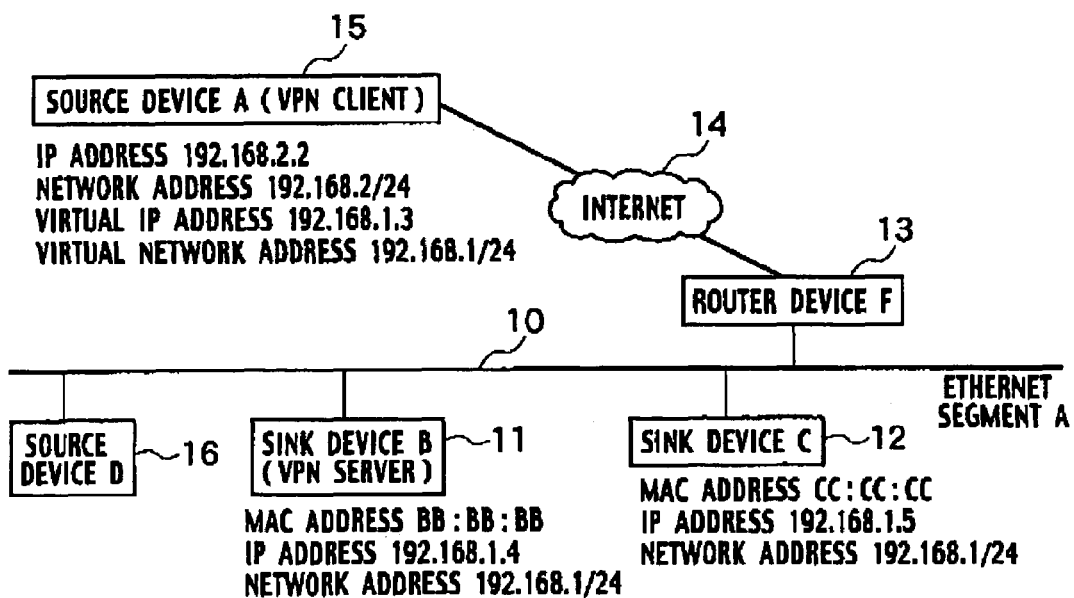
FIG. 1 is a block diagram showing one schematic configuration of a contents transmission/reception system according to the first embodiment of the present invention.

FIG. 1 shows a schematic configuration of the contents transmission/reception system according to the first embodiment of the present invention. The contents transmission/reception system of FIG. 1 has a sink device B 11, a sink device C 12, a source device D 16 and a router device F 13 which are connected to an Ethernet segment A 10, and a source device A 15 connected to the router device F 13 through the Internet 14. The sink device B 11 has a VPN server function, and the source device A 15 has a VPN client function.

The sink devices B 11 and C 12 are connected to the identical Ethernet segment A 10, and have the identical network address so as to constitute the local area network.

Here, the method for limiting the contents distribution range to a certain range (the Ethernet segment A 10 in this example) will be described. Namely, the transmission/reception of contents from the source device D 16 is permitted to the sink devices B 11 and C 12 physically connected the Ethernet segment A 10, but transmission/reception of contents from the source device A 15 which is connected to another Ethernet segment by using the VPN function is nor permitted, In this embodiment, even if the sink device and the source device constitute a virtual network by using the VPN such that it appears as if they are connected to the identical local area network, the case where the device is physically connected to the Ethernet segment and the case where the device is virtually connected are distinguished.

Here, an exemplary case of using DTCP (Digital Transmission Contents Protection) as a mechanism for device authentication and key exchange and contents encryption/decryption at a time of transmitting/receiving contents will be described. The DTCP is a content transmission copyright protection scheme that is de facto standard in the IEEE 1394 and USB, and provided with a mechanism for carrying out the authentication and key exchange between the transmission device and the reception device, and transferring AV data by encrypting the AV data that requires the copyright protection (see documents disclosed at "http://www.dtcp.com", for example).

Figure 2:
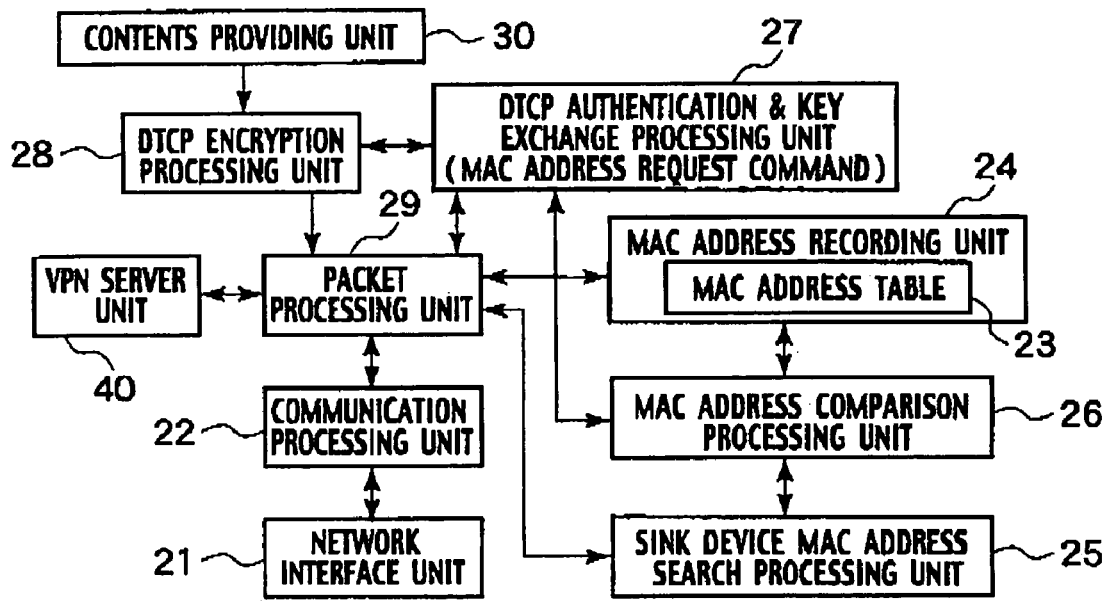
FIG. 2 is a block diagram showing an exemplary internal configuration of a source device A in the contents transmission/reception system of FIG. 1.

FIG. 2 shows an exemplary internal configuration of the source device A 15 or the source device D 16. As shown in FIG. 2, the source device A 15 or D 16 has a network Interface unit 21 for executing the physical layer processing of the Ethernet, a communication processing unit 22 for executing the datalink layer processing, a MAC address recording unit 24 for recording a MAC address of the network interface of the sink device into a MAC address table 23, a sink device MAC address search processing unit 25 for searching the MAC address from the IP address of the sink device, a MAC address comparison processing unit 26 for checking whether the MAC address acquired by the sink device MAC address search processing unit 25 and the MAC address recorded in the MAC address recording unit 24 coincide or not, an authentication and key exchange processing unit 27 for carrying out the DTCP authentication and key exchange processing for the purpose of the copyright protection, a DTCP encryption processing unit 28 for encrypting/decrypting data to be transmitted/received, a packet processing unit 29 for converting the contents data to be transmitted to the sink device and the DTCP management data into IP packets, a VPN server unit 40 for making the VPN connection as a VPN server upon receiving a VPN connection request from a VPN client, and a contents providing unit 30 for providing the contents to the packet processing unit 29.

Here, it is assumed that L2TP (Layer z Tunneling Protocol) is used as an exemplary VPN protocol. The L2TP is widely used for realizing the VPN, and the standardization of the L2TP is in progress by the IETF (see documents disclosed at "http://www.letf.org", for example.

Note also that it is assumed that the source device A 15 and the source device D 16 have the identical configuration, but it is not absolutely necessary to provide the VPN server unit 40 in the source device D16, because the source device D 16, the sink device B 11 and the sink device C 12 are connected on the identical Ethernet segment so that there is no need to make a connection by using the VPN.

Note also that the comparison processing is a processing for checking whether the MAC address corresponding to the IP address or the device ID of the sink device that is a contents transmission target is recorded in the MAC address table 23 or not, and checking whether the values of the MAC addresses coincide or not.

Figures 3, 4:
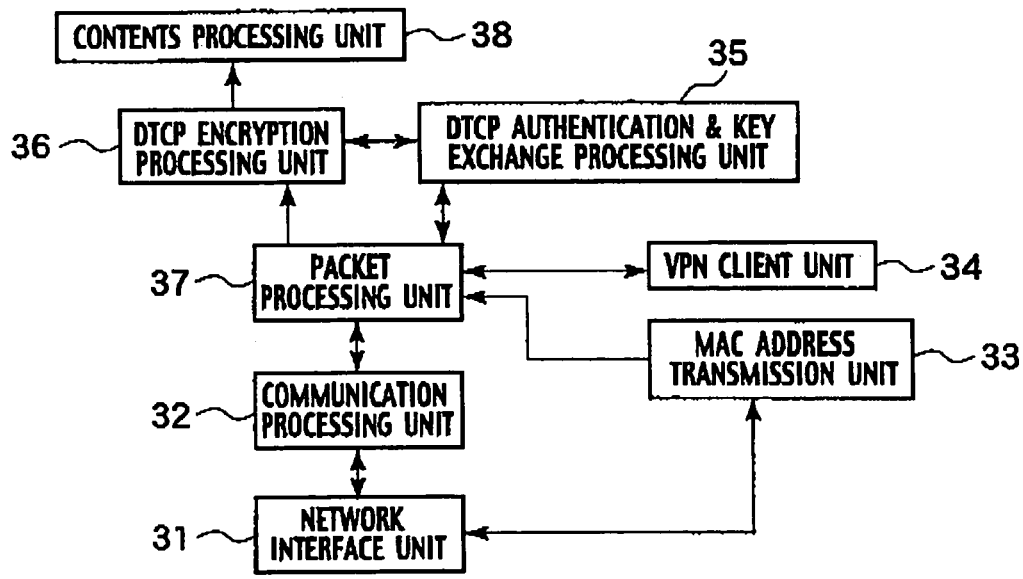
FIG. 3 is a diagram showing a structure of a MAC address table used in the source device A of FIG. 2.
FIG. 4 is a block diagram showing an exemplary internal configuration of a sink device B. C in the contents transmission/reception system of FIG. 1.

FIG. 3 shows a structure of the MAC address table 23. As shown in FIG. 3, the IP address, the MAC address and the DTCP device ID corresponding to each sink device are recorded in each record. The MAC address comparison processing unit 26 searches the MAC address by using the IP address or the device ID acquired from the sink device as a key, from this MAC address table 23.

FIG. 4 shows an exemplary internal configuration of the sink device B 11 or C 12. As shown in FIG. 4, the sink device B 11 or C 12 has a network interface unit 31 for executing the physical layer processing of the Ethernet, a communication processing unit 32 for executing the datalink layer processing, a MAC address transmission unit 33 for acquiring the MAC address stored in the network interface unit 31 and transmitting it to the source device, a VPN client unit 34 for making the connection to the VPN server via the Internet as a VPN client, a DTCP authentication and key exchange processing unit 35 for carrying out the DTCP authentication and key exchange processing for the purpose of the copyright protection, a DTCP encryption processing unit 36 for encrypting/decrypting the data to be transmitted/received, a packet processing unit 37 for converting the IP packets received from the source device into the contents data or the DTCP management data, and a contents processing unit 38 for carrying out a processing for outputting the decrypted contents to a display device or storing the decrypted contents.

Here, it is assumed that the sink device B 11 and the sink device C 12 have the identical configuration, but in the case where the source device D 16 and the sink device C 12 carry but communications, there is no need for the VPN connection, so that it is not absolutely necessary to provide the VPN client unit 34 in the sink device.

Note also that, in the configurations described above, the source device A 15 has the VPN server unit 40 and the sink device B 11 has the VPN client unit 34, but what is important is that the source device A 15 and the sink device B 11 carry out communications by the VPN, so that it is also possible to use configurations in which the VPN functions are interchanged, i.e., configurations in which the source device A 15 has the VPN client unit 34 and the sink device B 11 has the VPN server device 40.

Figure 5:
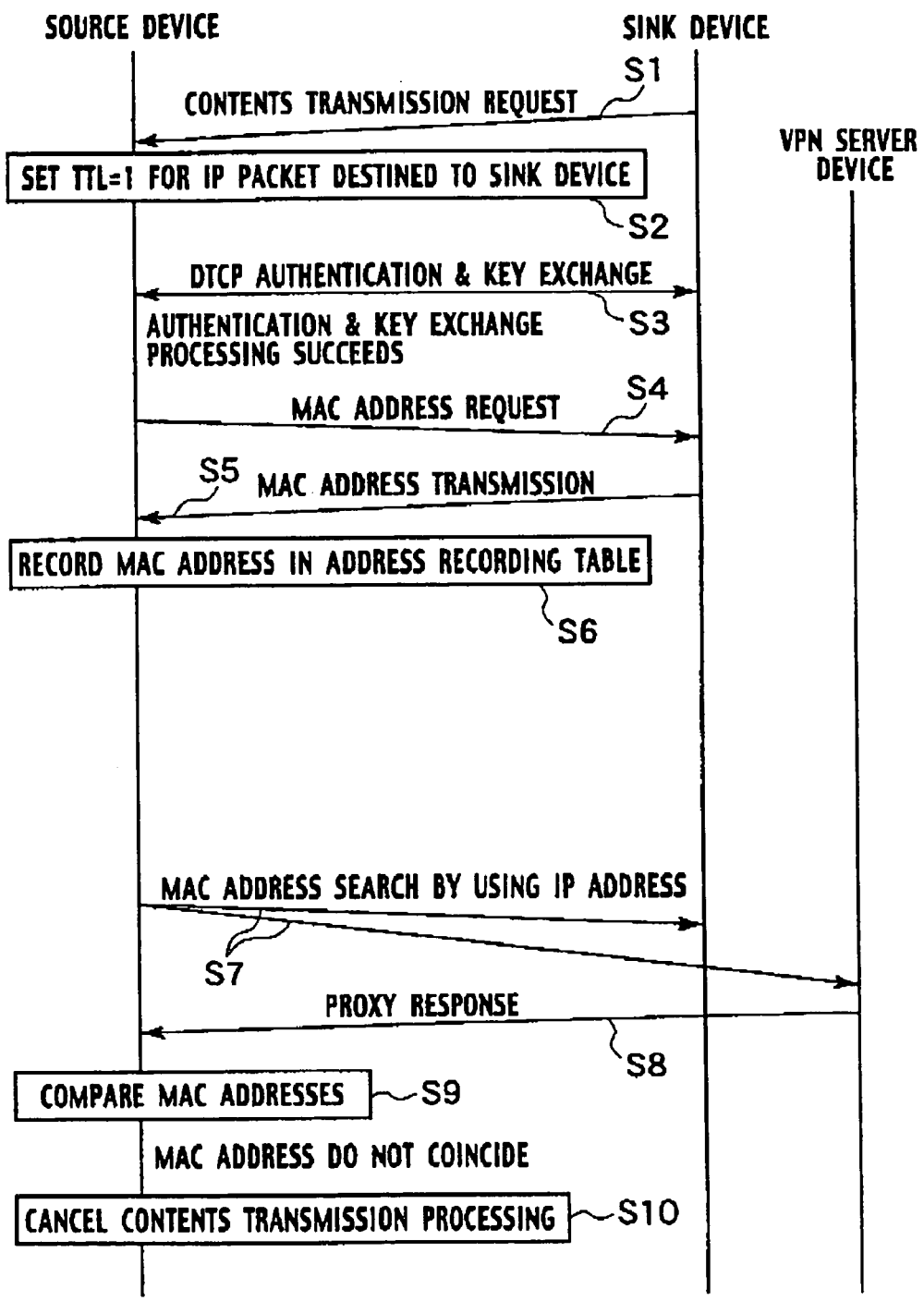
FIG. 5 is a sequence chart showing one processing procedure of the contents transmission/reception system of FIG. 1.
Figure 6:
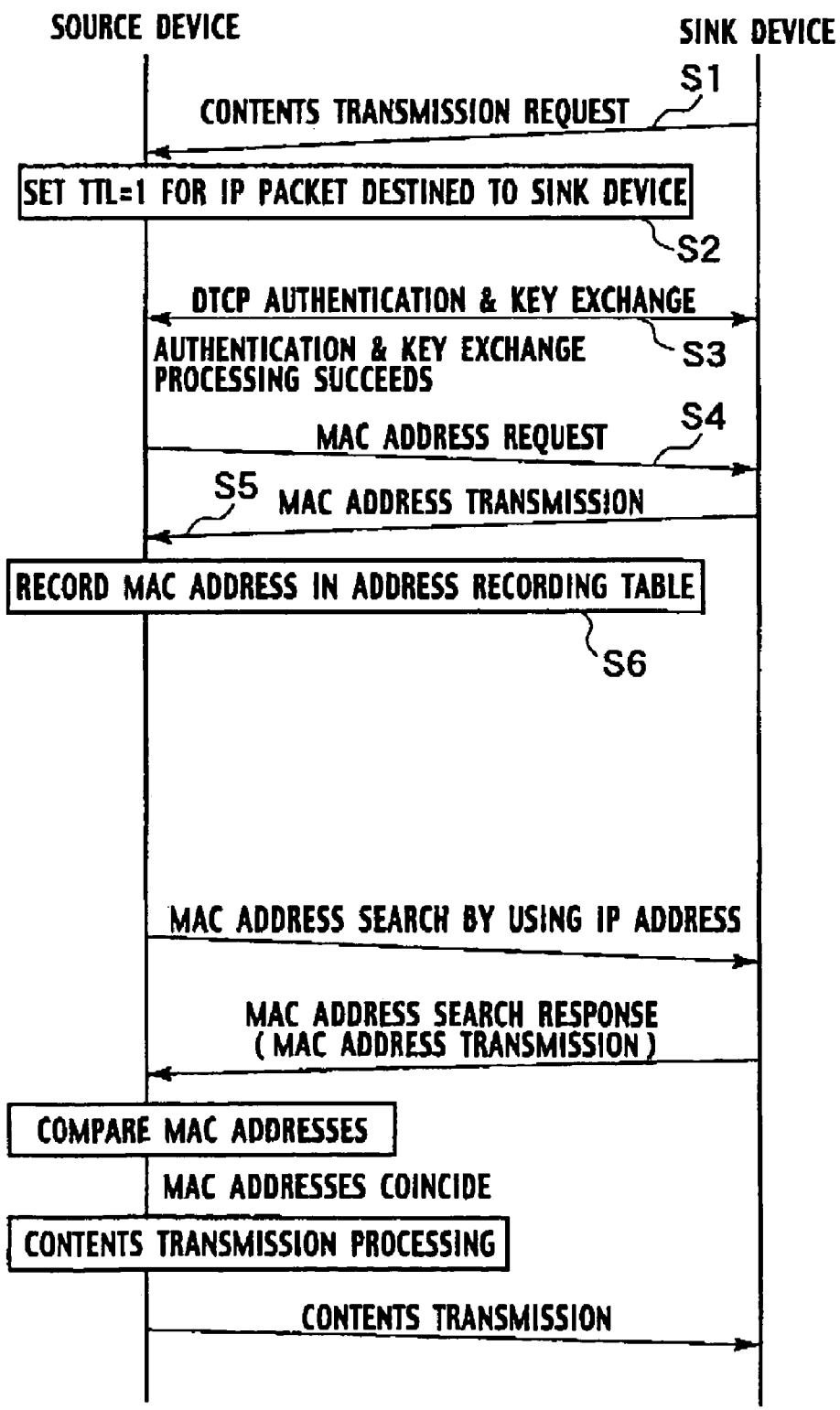
FIG. 6 is a sequence chart showing another processing procedure of the contents transmission/reception system of FIG. 1.
Figure 7:
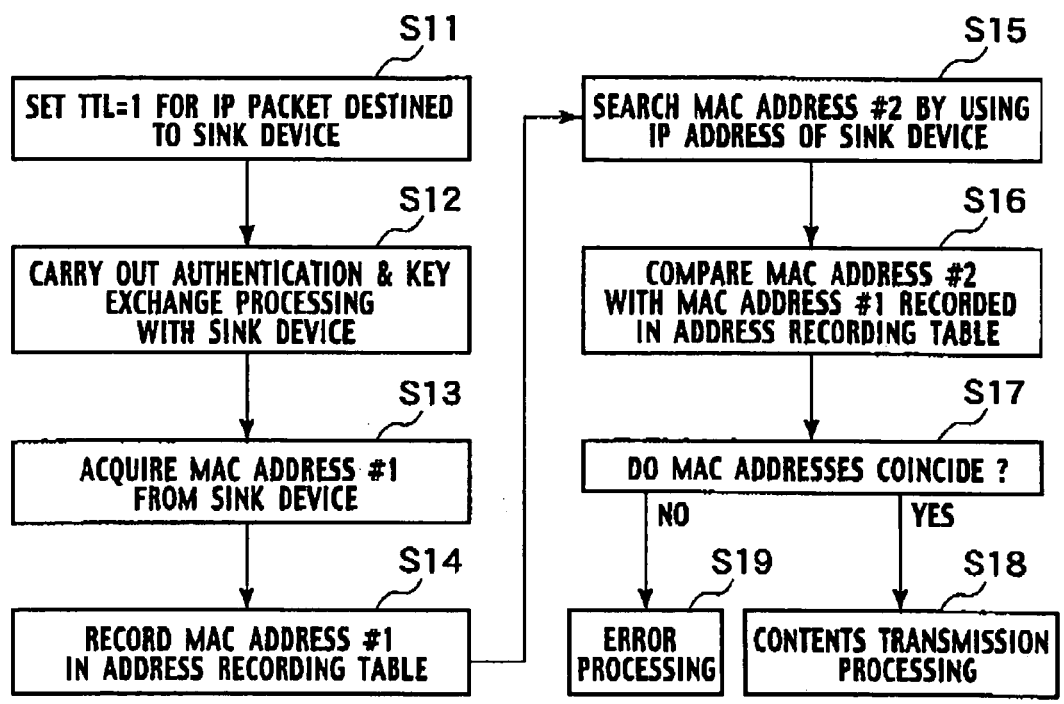
FIG. 7 is a flow chart showing a processing procedure of the source device A of FIG. 2.

FIG. 5 and FIG. 6 show a processing procedure of the communication system in this embodiment, and FIG. 7 shows a processing procedure of the source device A 15, in the following, the exemplary case of transmitting the contents from the source device D 16 to the sink device C 12 will be described first with references to FIG. 6 and FIG. 7.

First, when a contents transmission request is made from the sink device C 12 to the source device D 16 (step S1), the DTCP authentication and key exchange processing is carried out (step S2).

Note that when the contents transmission request is made, it is also possible to set the TTL field of the IP packets equal to one at a time of transmitting management data regarding the authentication and key exchange for the purpose of the copyright protection and the contents to the sink device C 12 (steps S2, S11). In addition, as described in the background art section above, it is also possible to carry out the comparison processing regarding whether the network addresses of the sink device and the source device coincide or not. If the network addresses of the sink device C 12 and the source device D 11 are different, a prescribed error processing is carried out and the communication is interrupted. These processings may be carried out before, during, or after the authentication and key exchange processing.

When the DTCP authentication and key exchange processing succeeds (step S3), the source device D 16 transmits a command for requesting a transmission of the MAC address to the sink device C 12 (step S4). This command can be an independent command or a "MAC address request command" added to the group of commands defined by the DTCP. Upon receiving the MAC address request command, the sink device C 12 transmits the MAC address to the source device D 16 through the MAC address transmission unit 33 (step S5).

At this point, it is also possible to attach a signature for proving that the MAC address is nor altered on the communication route. This signature can be attached by the well known method such as ISO/IEC 14888, for example.

When the MAC address of the sink device C 12 is acquired (step S13), the source device D 16 registers the MAC address into the MAC address table 23 (steps S6, S14). At this point, the MAC address and the IP address or the DTCP device ID of the sink device C 12 may be recorded as a set.

What is described above is a method for registering the MAC address of the sink device C 12 into the MAC address table 23 by receiving the MAC address from the sink device C 12 via the network. It is also possible to realize this registration by many other methods. For example, it is possible to use (1) a method for inputting the MAC address of the sink device C 12 into the source device D 16 by the user in advance by using an interface such as buttons, or (2) a method for recording the MAC address into the MAC address table 23 of the source device D 18 by using a card or the like that records the MAC address of the sink device C 12.

Next, the source device D 16 transmits a packet for making an inquiry of the MAC address by using the IP address to the Ethernet segment A 10. This can be realized by the well known method such as the ARP (Address Resolution Protocol) defined by RFC 826, for example. If they are connected to the identical segment physically, the host having that IP address returns the MAC address assigned to the own device as a response (steps S8, S15). For example, when the source device D 16 transmitted a request of the ARP to the IP address "192.168.1.5", the sink device C 12 with the IP address "192.168.1.5" returns its own MAC address "CC:CC:CC" as a response to the source device D 16.

Next, the source device D 16 carries out the comparison processing for checking whether the MAC address of the sink device C 12 acquired as a result of the MAC address request command and the MAC address acquired by the ARP coincide or not (steps S9, S16). If two values coincide, the processing is continued (steps S17, S18).

At the step S7 described above, it is also possible to search the MAC address by using the device ID as a key, instead of using the IP address as a key, at a time of searching the MAC address of the correspondent sink device from the MAC address table 23.

In the comparison processing of the above described step S16, if the MAC addresses do not coincide, a prescribed error processing is carried out and the communication is interrupted (steps S10, S19). Also, when the MAC address of the sink device C 12 cannot be acquired by the ARP, a prescribed error processing is carried out and the communication is interrupted. In this example, the value registered in the MAC address table in advance and the value acquired by the ARP are identical so that the contents transmission processing is carried out.

Next, an exemplary case of transmitting the contents from the source device A 15 to the sink device B 11 is shown in FIG. 5. The source device A 15 is connected to the sink device B 11 by the VPN, and in a state capable of carrying out communications. The processing by which the source device A 15 requests the MAC address to the sink device B 11, acquires the MAC address of the sink device B 11 by the upper level protocol of the IP, and records the MAC address (step S6) can be carried out similarly as in the case of transmission from the source device D 16 to the sink device C 12. The source device A 15 transmits a packet for inquiring the MAC address by using the IP address of the sink device B 11 (the ARP packet, for example), to the Ethernet segment to which the source device A 15 is connected. In this case, the sink device B 11 is not connected to that Ethernet segment, so that the sink device B 11 will never return its own MAC address "CC:CC:CC" as a response. For this reason, the source device A 15 will not acquire the MAC address of the sink device B 11 and the MAC address comparison processing will fail. As a result, the source device A 15 carries out the error processing and the communication is terminated without transmitting the contents to the sink device B 11.

Note that at a time of the error processing when the MAC addresses do not coincide or at a time of disconnecting the connection with the sink device, the record regarding the sink device may be stored or may be deleted. For example, when the IP address of the sink device is assigned by the DHCP, the IP address at a time of the next access can be different so that it is preferable to delete the record so as to save the memory capacity of the table and simplify the configuration of the device.

In the above, the exemplary case of carrying out the MAC address checking processing only when the authentication succeeds in the DTCP authentication and key exchange processing has been described. Besides that, there are other methods for checking the MAC address including (1) a method for transmitting the MAC address along with the DTCP contents request command at a time of transmitting the contents request from the sink device to the source device, and (2) a method for carrying out the MAC address checking processing prior to the DTCP authentication and key exchange processing.

What is important here is that the sink device has a function for transmitting the MAC address to the source device by the method which is not the Ethernet, and it is possible to judge whether the sink device and the source device are physically connected to the Ethernet segment or not even if the sink device and the source device are on the identical sub-net, by comparing the MAC address with the MAC address acquired by the processing for searching the MAC address by using the IP address on the Ethernet.

Even if the router device physically connected to the same Ethernet segment as the source device A 15 forges the MAC address and transmits the same MAC address as the MAC address of the sink device B 11 as a response to the MAC address request from the source device A 15, the source device A 15 would transmit the Ethernet packets to that forged MAC address, so that the sink device B 11 cannot receive these packets and the object of limiting the contents distribution range can be achieved.

Figure 8:
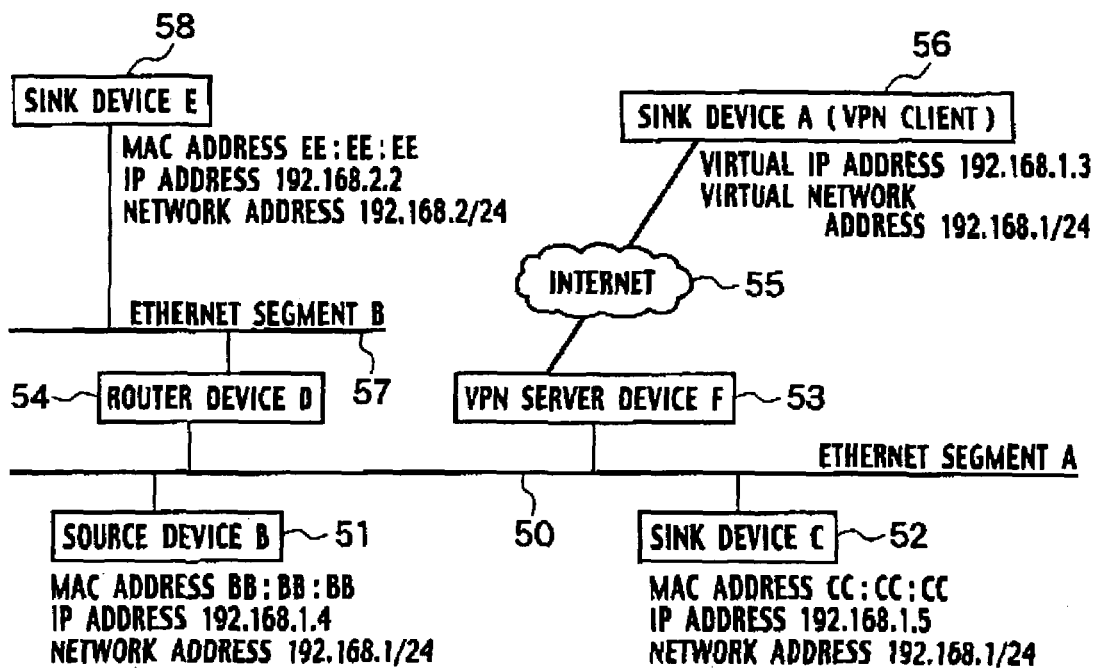
FIG. 8 is a block diagram showing another schematic configuration of a contents transmission/reception system according to the first embodiment of the present invention in which a VPN server device is connected between a source device and a sink device.

Next, the contents transmission/reception in the case where a VPN server device is connected between the source device and the sink device as shown in FIG. 8 will be described. The contents transmission/reception system of FIG. 8 has a source device B 51, the sink device C 52, a VPN server device F 53 and a router device D 54 which are connected to the identical Ethernet segment A 50, and a sink device. A 56 connected to the VPN server device F 53 through the Internet 55 and a sink device E 58 connected to an Ethernet segment B 57.

The source device B 51, the sink device C 52, the VPN server device F 53 and the router device D 54 have the identical network address so as to constitute a local network.

The sink device A 56 has a global IP address assigned and is in a state capable of making the connection to the VPN server device F 53 through the Internet 55 by using the VPN client function.

In the contents transmission/reception system of FIG. 8, the case of transmitting the contents from the source device B 51 to the virtually connected sink device A 56 via the VPN server device F 53 will be considered how.

First, the procedure by which the source device B 51 receives the MAC address from the sink device A 56 and registers it can be the same as the above described procedure. Then, the source device B 51 transmits a packet for inquiring the MAC address by using the IP address of the sink device A 56 to the Ethernet segment A 50.

Since the sink device A 56 is not physically connected to the Ethernet segment A 50, the VPN server device F 53 returns its own MAC address as a proxy of the MAC address of the sink device A 56 as a response. The source device B 51 carries out the comparison processing for these two MAC addresses, but the MAC address of the sink device A 56 and the MAC address of the VPN server device F 53 are different so that the values do not coincide. For this reason, the contents transmission processing will be interrupted.

Next, the case of transmitting the contents from the source device B 51 to the sink device E 58 will be considered. The source device B 51 requests the MAC address to the sink device 58, and acquires the MAC address of the sink device E 58 by the upper level protocol of the IP. However, in this configuration, the Ethernet segment A 50 to which the source device B 51 is connected and the Ethernet segment B 57 to which the sink device E 58 is connected are different. Consequently, even if the source device B8 51 transmits a packet for inquiring the MAC address by using the IP address of the sink device E 58, this packet will not be transferred to the sink device E 58 by the router device D 54, and the source device B 51 will not receive the MAC address from the sink device E 58. As a result, the MAC address comparison processing carried out by the source device B 51 will fall and the contents transmission processing will be interrupted.

By the processing described above, the source device B 51 of FIG. 8 can permit the contents transmission/reception to the sink device C 52 that is connected to the identical Ethernet segment A 50, and surely prohibit the contents transmission/reception to the sink device A 56 that is connected through the VPN server device F 53 and the sink device E 58 that belongs to a different Ethernet segment B 57 through the router device D 54.

In this way, according to this embodiment, in the contents transmission/reception system in a configuration shown in FIG. 8, for example, the source device B 51 can permit the contents transmission/reception only to the sink device C 52 that is connected to the identical Ethernet segment A 50, and surely prohibit the contents transmission/reception to the sink device connected through the VPN server device F 53, for example. As a result, it is possible to prevent the illegal contents transmission/reception.

In the above, the configuration in which the sink device A 56 has the VPN client function and makes the connection to the Ethernet segment A 50 via the VPN server device F 53, but this embodiment is also applicable to the configuration in which the source device has the VPN client function.

Figure 9:
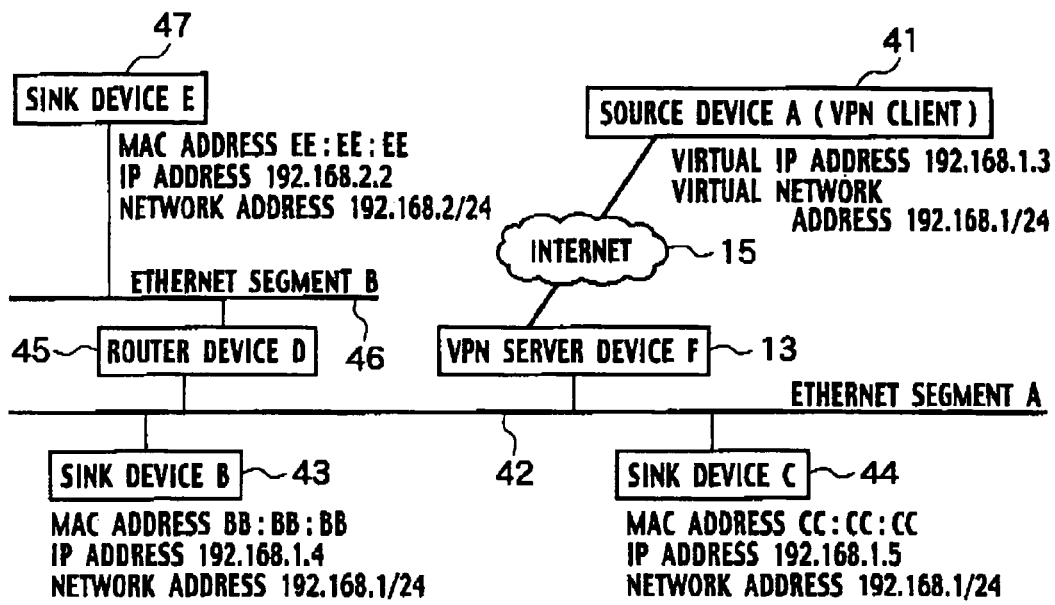
FIG. 9 is a block diagram showing one schematic configuration of a contents transmission/reception system according to the second embodiment of the present invention.

FIG. 9 shows a schematic configuration in the case where the connected states of the source device and the sink device are interchanged. Unlike FIG. 8, the contents transmission/reception system of FIG. 9 has a source device A 41 which has the VPN client function and is connected to the VPN server device F 13 via the Internet 15, a sink device B 43, a sink device C 44 and a router device D 45 which are connected to the Ethernet segment A 42, and a sink device E 47 which is connected to the router device D 45 through the Ethernet segment B 46.

Namely, the sink device B 43 and the sink device C 44 that are connected to the VPN server device F 13 are existing at locations capable of carrying out communications with the source device A 41 via the VPN server device F 13. However, the source device A 41 and the sink devices B 43 and C 44 are connected to the different local area network, so that the transmission/reception of the contents that require the copyright protection should not be permitted between them.

Here, the source device A 41 requests the MAC address to the sink device B 43, and acquires the MAC address of the sink device B 43 by the method which is not the IP. The source device A 41 transmits a packet (an ARP packet, for example) for inquiring the MAC address by using the IP address of the sink device B 43 to the Ethernet segment to which the source device A 41 is connected. In this case, the sink device B 43 is not connected to that Ethernet segment, so that the sink device B 43 will never return its own MAC address "BB:BB:BB" as a response. As a result, the source device A 41 will not acquire the MAC address of the sink device B 43, and the MAC address comparison processing will fail. Consequently, the source device A 41 will carry out the error processing, and terminate the communication without transmitting the contents to the sink device B 43. In this way, it is possible to prevent the contents transmission/reception to the sink device B 43, and the contents distribution range of the source device A 41 can be limited within the local area network of the source device A 41.

(Second Embodiment)

The second embodiment is directed to a configuration in which the VPN server device and the VPN client device are provided between the sink device and the source device such that the tunneling between two networks is realized by the VPN devices.

Figure 10:
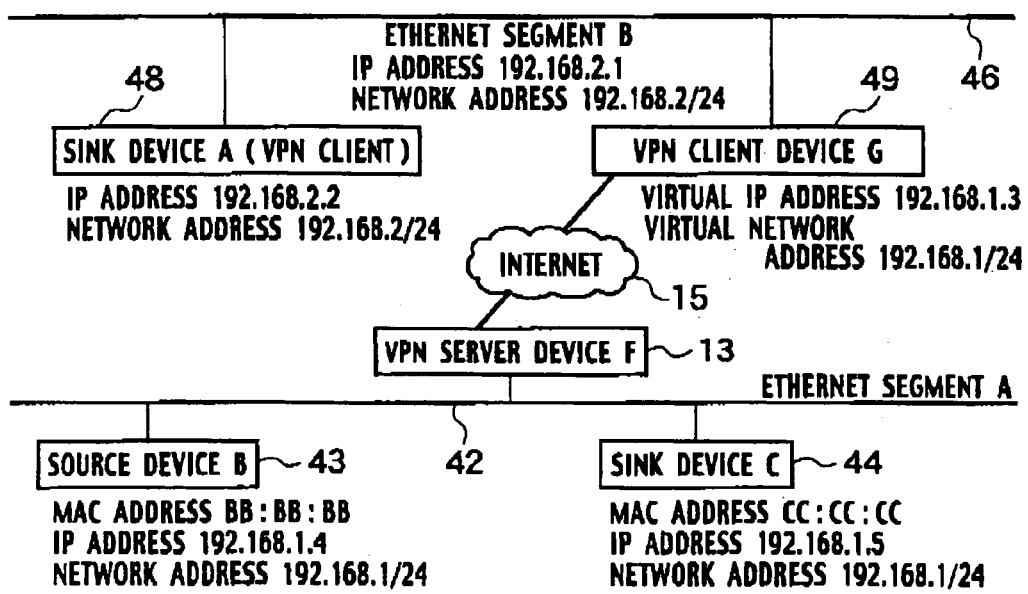
FIG. 10 is a block diagram showing another schematic configuration of a contents transmission/reception system according to the first embodiment of the present invention in which a VPN server device and a VPN client device are tunneling two networks.
Figure 11:
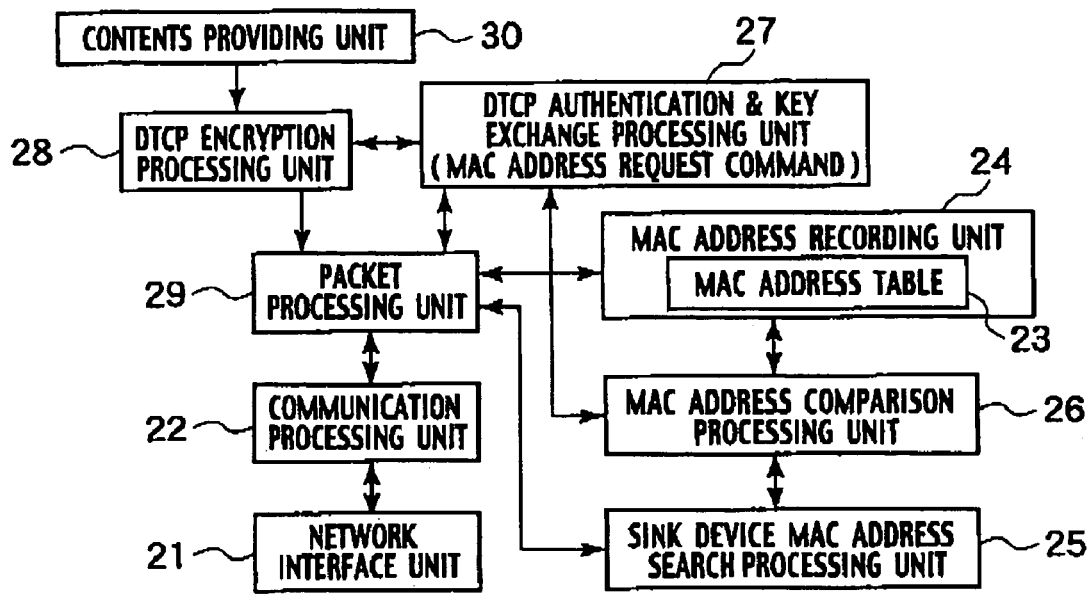
FIG. 11 is a block diagram showing one exemplary internal configuration of a source device in the contents transmission/reception system of FIG. 9 or FIG. 10.
Figure 12:
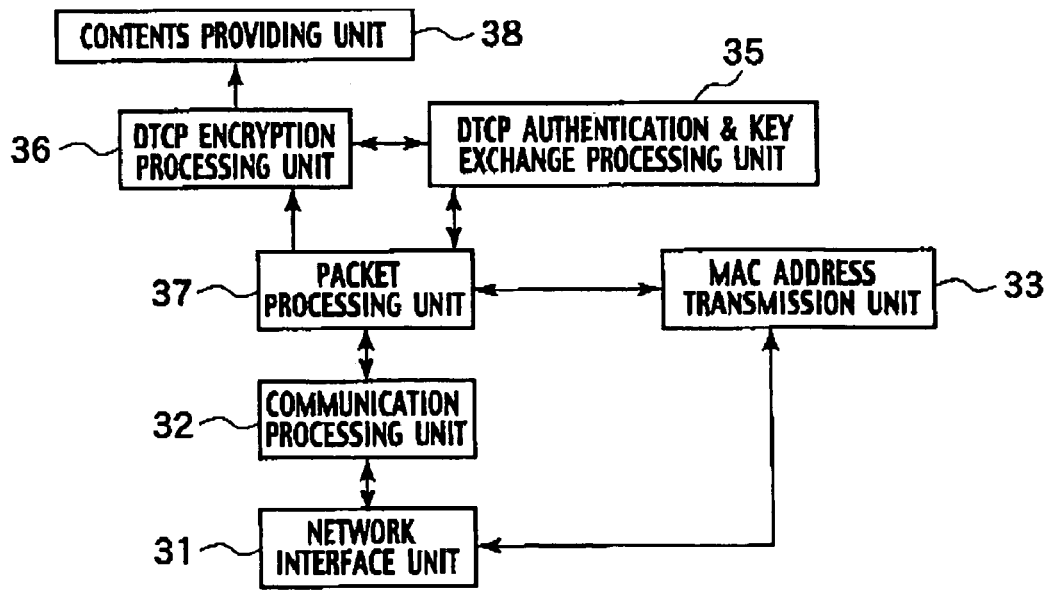
FIG. 12 is a block diagram showing one exemplary internal configuration of a sink device in the contents transmission/reception system of FIG. 9 or FIG. 10.

FIG. 10 shows a configuration of the contents transmission/reception system in which a VPN server device F 13 and a VPN client device G 49 are provided between a sink device A 48 and a source device B 43 such that the tunneling between two networks is realized by the VPN server device F 13 and the VPN client device G 49. FIG. 11 shows the internal configuration of the source device and FIG. 12 shows the internal configuration of the sink device in the contents transmission/reception system shown in FIG. 10.

Unlike FIG. 1 and FIG. 8, the contents transmission/reception system of FIG. 10 has the VPN server device F 13 and the VPN client device G 49 provided between the sink device A 48 and the source device B 43, which are connecting the respective networks. However, the Ethernet segment A 42 to which the source device B 43 belongs and the Ethernet segment B 46 to which the sink device A 48 belongs are different, so that the MAC address of the sink device A 48 cannot be acquired by the MAC address search request from the source device B 43, and the comparison processing will fall. As a result, it is possible to confirm that the sink device A 48 does not exists in the Ethernet segment A 42 to which the source device B 43 belongs.

In this way, in this second embodiment, the contents transmission to the sink device connected to the different Ethernet segment can be surely prohibited by permitting the contents transmission only when the the MAC addresses coincide as a result of the MAC address comparison.

In the embodiments described above, when the sink device transmits its own MAC address in response to the request from the source device, it is also possible to transmit the MAC address by attaching an electronic signature. When the electronic signature is attached to the MAC address from the sink device, the source device carries out the verification processing to check whether the MAC address has been altered or not, and records the MAC address into the MAC address table only when the MAC address has not been altered. In this way, the forgery of the MAC address can be surely prevented and the security performance can be improved.

Figure 13:
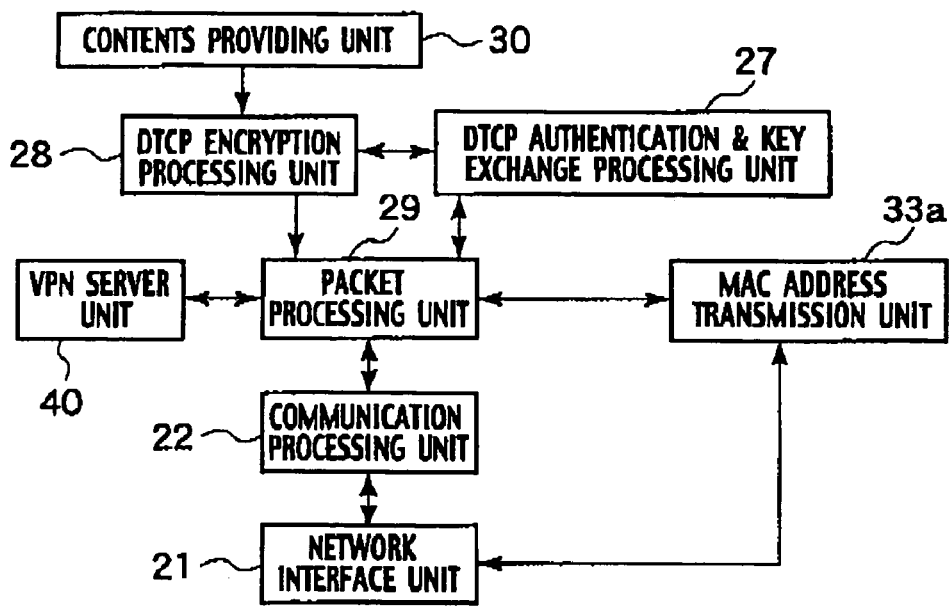
FIG. 13 is a block diagram showing another exemplary internal configuration of a source device in the contents transmission/reception system of FIG. 9 or FIG. 10.
Figure 14:
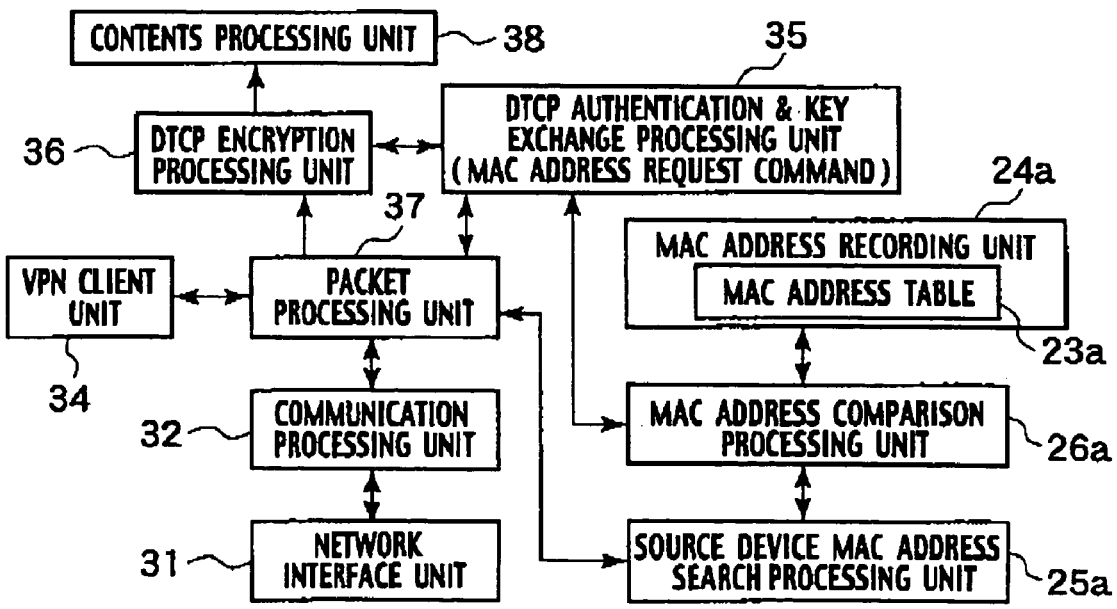
FIG. 14 is a block diagram showing another exemplary internal configuration of a sink device in the contents transmission/reception system of FIG. 9 or FIG. 10.

Also, the embodiments described above are directed to an exemplary case of carrying out the MAC address comparison inside the source device, but it is also possible to carry out the MAC address comparison inside the sink device which is the contents receiving side. For example, in the case where the roles of the sink device B 11 corresponding to the source device A 15 and the source device A 15 are interchanged in the configuration shown in FIG. 1, the internal configuration of the source device A 15 becomes as shown in FIG. 13, and the internal configuration of the sink device B 11 becomes as shown in FIG. 14.

In this case, the contents reception from the source device is permitted only when the source device transmits its own MAC address to the sink device and the MAC addresses coincide as a result of the MAC address comparison inside the sink device, and the contents reception refusal message is transmitted to the source device otherwise, such that the contents transmission target can be limited.

Figure 15:
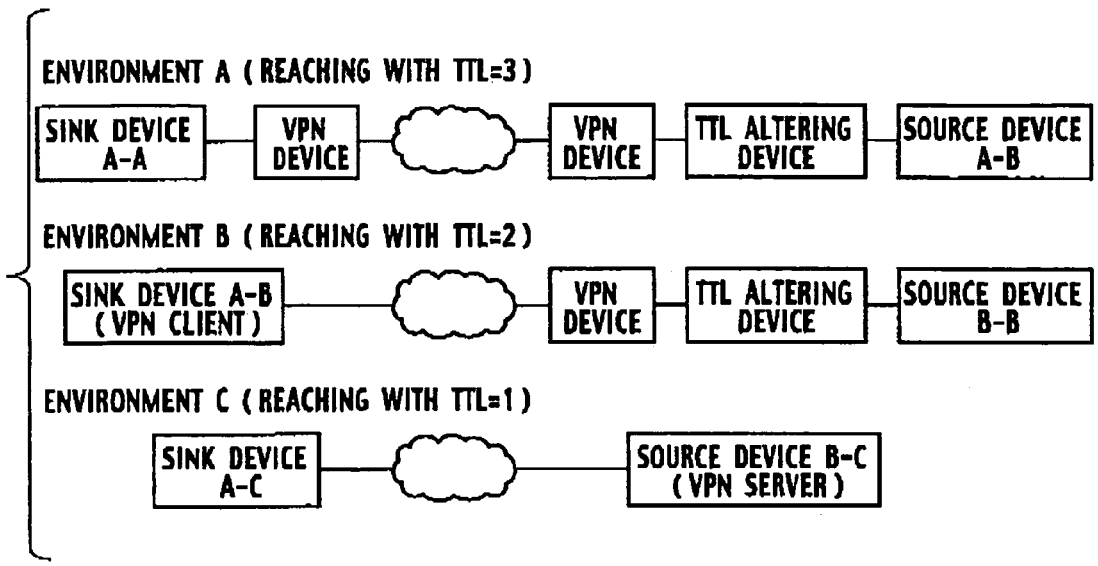
FIG. 15 is a diagram showing three types of VPN device connection state in the contents transmission/reception system of FIG. 9 or FIG. 10.

FIG. 15 shows three types of the VPN device connection state. The VPN device carries out the subtraction of the TTL because it carries out the routing by itself. Namely, in order to carry out communications between the sink device and the source device through the VPN device as shown in FIG. 15, the TTL field of the IP header have to be set greater than or equal to an appropriate value.

For example, in the configuration of the environment A shown in FIG. 15, the VPN device carries out the routing, so that the subtraction of the TTL field is carried out at each VPN device. Consequently, in order to carry out communications between the sink device A-A and the source device A-B, the TTL value have to be set greater than or equal to 3. Similarly, in the configuration of the environment B, in order to carry out communications between the sink device B-A and the source device B-B, the TTL value have to be set greater than or equal to 3.

For this reason, by setting the TTL value equal to 1, it is possible to limit the contents distribution through the VPN device in the environment A and the environment B. Here, it should be noted that the TTL field can be changed easily. For example, if a malicious user places a TTL changing device for increasing the TTL field to a certain value between the source device and the VPN device, it would become possible to transmit/receive the contents beyond the distribution range assumed by the source device and the sink device.

However, by using the method described above, even if the TTL changing device is placed, because the source device and the sink device are not physically belonging to the identical segment, it is still impossible to learn the MAC address of the correspondent by the ARP, so that the influence of the TTL changing device can be avoided.

Namely, according to the embodiments described above, the existence of the VPN can be detected in a uniform manner regardless whether the environment is A, B or C, so that the contents distribution range can be limited.

(Third Embodiment)

In the first and second embodiments described above, if the same MAC address as that of the sink device is set to the router device or the VPN device that is physically connected to the identical Ethernet segment as the source device, there is a possibility of becoming impossible to accurately judge whether the source device and the sink device are physically connected to the identical Ethernet segment or not.

For this reason, the third embodiment resolves such a potential problem of the first and second embodiments.

Figure 16:
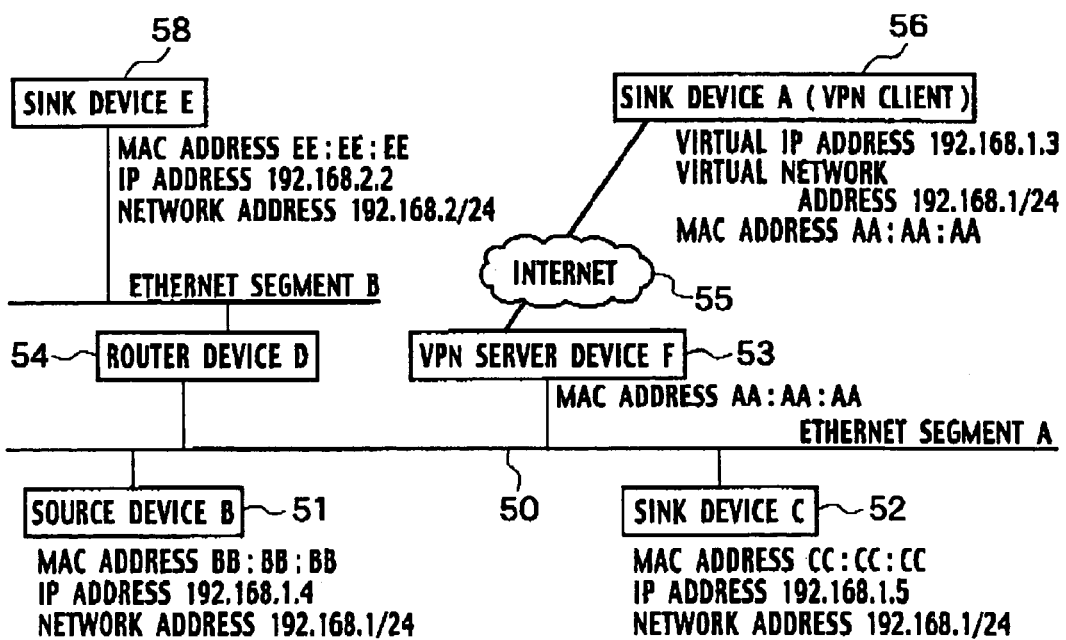
FIG. 16 is a block diagram showing one schematic configuration of a contents transmission/reception system according to the third embodiment of the present invention.

FIG. 16 shows a schematic configuration of the contents transmission/reception system according to the third embodiment of the present invention. The VPN server device F 53 of FIG. 18 has the same MAC address value "AA:AA:AA" as the sink device A 56, unlike FIG. 8.

In principle, the MAC address is assigned to be different for different physical network interfaces by each manufacturing vendor. However, suppose that the MAC addresses happen to coincide despite of this principle, or a malicious user gives the same MAC address values as the sink device to the VPN server device or the router device in order to circumvent the MAC address comparison check processing.

In this case, the value of the MAC address obtained by the processing (ARP, for example) for searching the MAC address by using the IP address on the Ethernet by the source device B 51 is "AA:AA:AA" which is the MAC address of the VPN server device. As a result, the MAC address "AA:AA;AA" of the sink device A 56 acquired by the upper level protocol coincides with the value of the MAC address obtained by the processing for searching the MAC address by using the IP address, so that it is impossible to judge whether the source device and the sink device are physically connected to the identical Ethernet segment or not.

In the third embodiment, even if the VPN device or the router device that is physically connected to the identical Ethernet segment as the source device has the MAC address identical to that of the sink device, it is made possible to check whether the source device and the sink device are physically connected to the identical segment or not, by checking whether the address resolution request has been made surely between the source device and the sink device or not.

Figure 17:
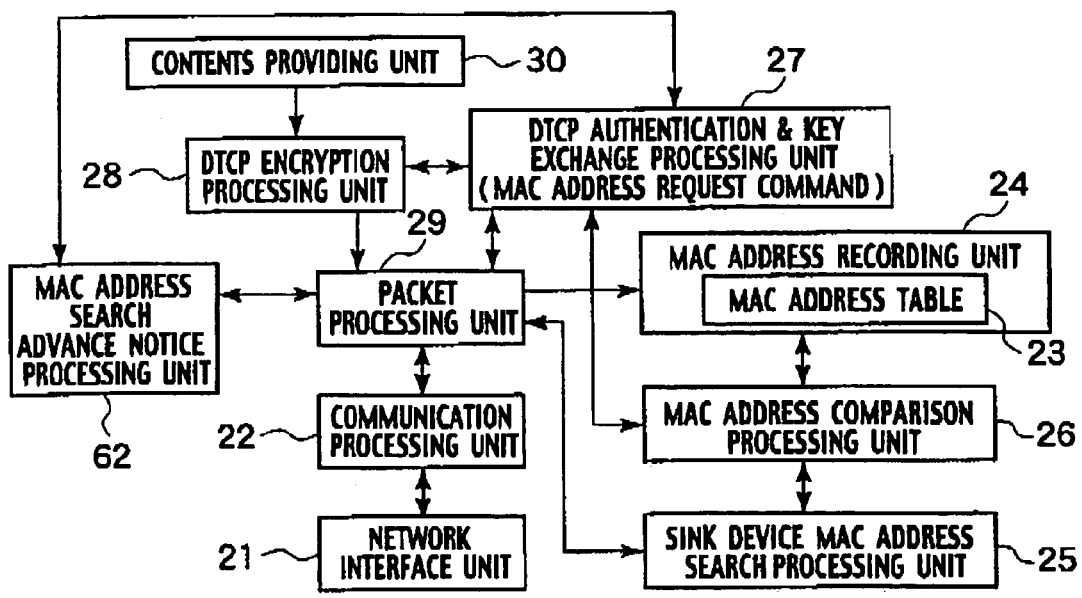
FIG. 17 is a block diagram showing an exemplary internal configuration of a source device A in the contents transmission/reception system or FIG 16.

FIG. 17 shows an internal configuration of the source device B 41 according to the third embodiment. The difference from the configuration of FIG. 2 is that it has a MAC address search advance notice processing unit 62 for transmitting a message for explicitly notifying that "the MAC address search request will be sent from now" (this message will be referred to as a MAC address search advance notice) before transmitting a message for searching the MAC address by using the IP address to the sink device, and carrying out a processing for checking whether a search advance notice response is transmitted from the sink device or not.

Figure 18:
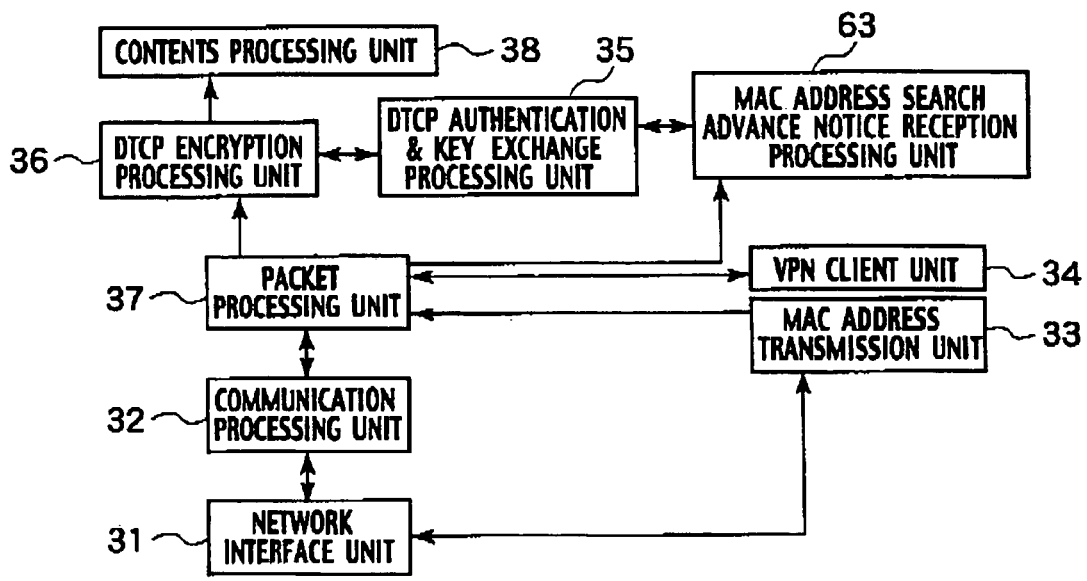
FIG. 18 is a block diagram showing an exemplary internal configuration of a sink device B, C in the contents transmission/reception system of FIG. 16.

FIG. 18 shows an internal configuration of the sink device A 56 according to the third embodiment. The difference from the configuration of FIG. 4 is that it has a MAC address search advance notice reception processing unit 63 for receiving the MAC address search advance notice transmitted from the source device and carrying out a prescribed processing.

Figure 19:
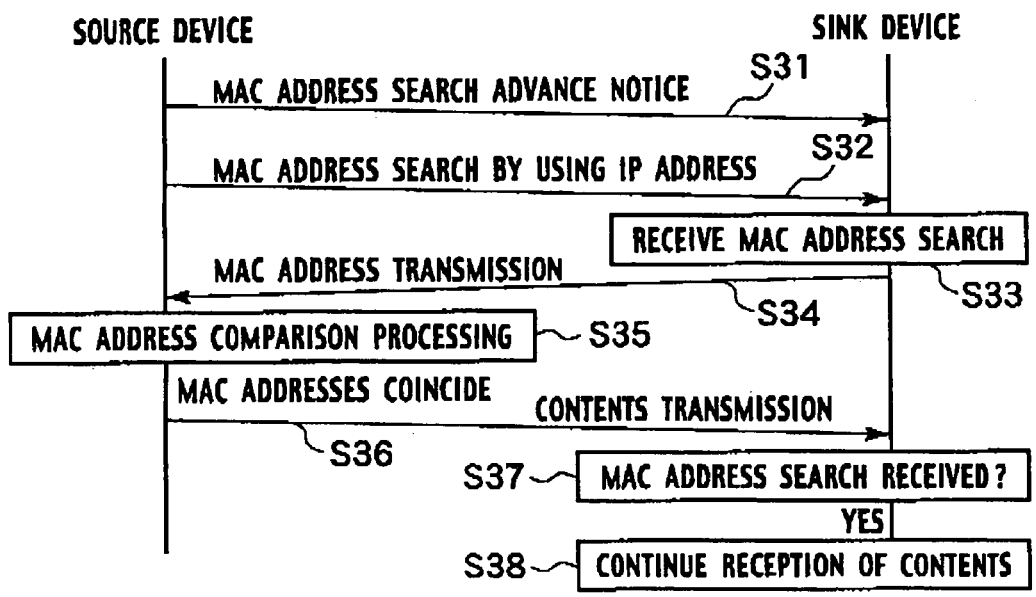
FIG. 19 is a sequence chart showing one processing procedure of the contents transmission/reception system of FIG. 16 in the case where a source device and a sink device are physically existing in an identical segment.

FIG. 19 shows a processing procedure in the third embodiment, which is a processing procedure in the case where the source device and the sink device are physically existing in the identical segment (the case where the source device B 51 and the sink device C 52 shown in FIG. 8 carry out communications, for example).

Here, in order to simplify the explanation, it is assumed that the DTCP authentication and key exchange processing (step S3), the MAC address request (step S4) and the MAC address transmission (step S5) shown in FIG. 5 have been carried out, the DTCP authentication and key exchange has succeeded so that the source device has acquired the MAC address of the sink device.

First, the source device transmits the message for requesting the search of the MAC address by using the IP address and the MAC address search advance notice to the sink device (steps S31 to S33). The MAC address search advance notice can be transmitted by the upper level protocol of the Ethernet (by the IP packet, for example). Note that these messages may be transmitted simultaneously or separately.

The sink device transmits its own MAC address to the source device as a response to the MAC address search request (step S34). Also, the sink device records the fact that the MAC address search request transmitted from the source device has received.

The source device carries out the processing for comparing the MAC address received as a result of the MAC address search request and the MAC address acquired in advance (step S35). Here, the MAC addresses coincide so that the comparison processing succeeds and the source device transmits the contents to the sink device (step S36).

On the other hand, the sink device carries out the processing for checking whether the MAC address search request has received or not (step S37). Here, if the MAC address search request message from the source device has received, the processing will be continued (step S38). If the MAC address search request message has not received, the processing will be interrupted. In this case, the sink device has received the MAC address search request at the step S33, so that this checking processing succeeds and the reception of the contents will be started.

Figure 20:
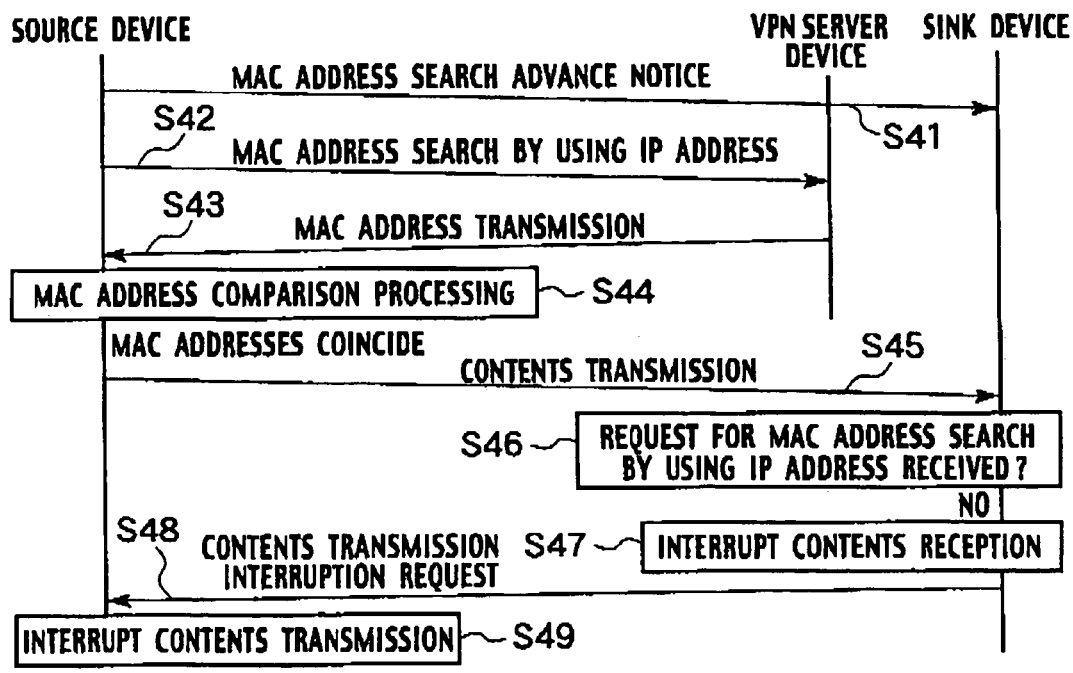
FIG. 20 is a sequence chart showing another processing procedure of the contents transmission/reception system of FIG. 16 in the case where a source device and a sink device are not physically existing in an identical segment.

FIG. 20 shows a processing procedure in the third embodiment in the case where the source device and the sink device are not physically existing in the identical segment (the case where the source device B 51 and the sink device A 56 shown in FIG. 8 carry out communications, for example).

Similarly as in the case of FIG. 19, first, the source device transmits the message for requesting the search of the MAC address by using the IP address and the MAC address search advance notice to the sink device (steps S41 and S42).

The MAC address search advance notice is transmitted to the sink device by the method which is not the Ethernet, so that the sink device receives the MAC address search advance notice even if the VPN server exists in a middle.

However, as far as the MAC address search request is concerned, the sink device is not physically connected to the identical Ethernet segment so that the VPN server device makes a response as a proxy (step S43) and the sink device cannot receive this search request.

Here, if the MAC address or the VPN server device and the MAC address of the sink device coincide, the MAC address comparison processing at the source device succeeds (step S44) so that the source device transmits the contents (step S45) despite of the fact that the sink device does not physically exists in the identical Ethernet segment.

On the other hand, the sink device checks whether the MAC address search request message has received or not (step S46), and when it is ascertained that this request message has not received, the sink device interrupts the contents reception (step S47). Then, the sink device may transmit a contents transmission interruption request message to the source device (step S48), such that upon receiving this message, the source device interrupts the contents transmission to the sink device (step S49).

In this way, in the third embodiment, according to whether the sink device has received the MAC address search request message or not, it is possible to check whether the source device and the sink device are physically existing in the identical segment or not, even if a device that makes a response to the MAC address search request by forging the MAC address exists between the source device and the sink device.

Note that, in the third embodiment, as long as the sink device can receive the MAC address search request from the source device, it is not absolutely necessary to transmit the MAC address search advance notice from the source device to the sink device. However, in order to confirm that the MAC address search request message is the one transmitted from the source device, the MAC address or the IP address the source device or both can be included in the MAC address search advance notice to be transmitted to the sink device. In this way, when the sink device receives the MAC address search request, it becomes possible to judge whether it is the one transmitted from the source device or not.

Also, the sink device can comprehend the need to monitor the MAC address search request upon receiving the MAC address search advance notice, so that there is no need to monitor the MAC address search request until the MAC address search advance notice is received, and the processing load of the sink device in the normal state can be reduced.

(Fourth Embodiment)

The fourth embodiment is directed to the case of checking whether the sink device and the source device are existing in the identical segment or not by a processing procedure different from the third embodiment.

Figure 21:
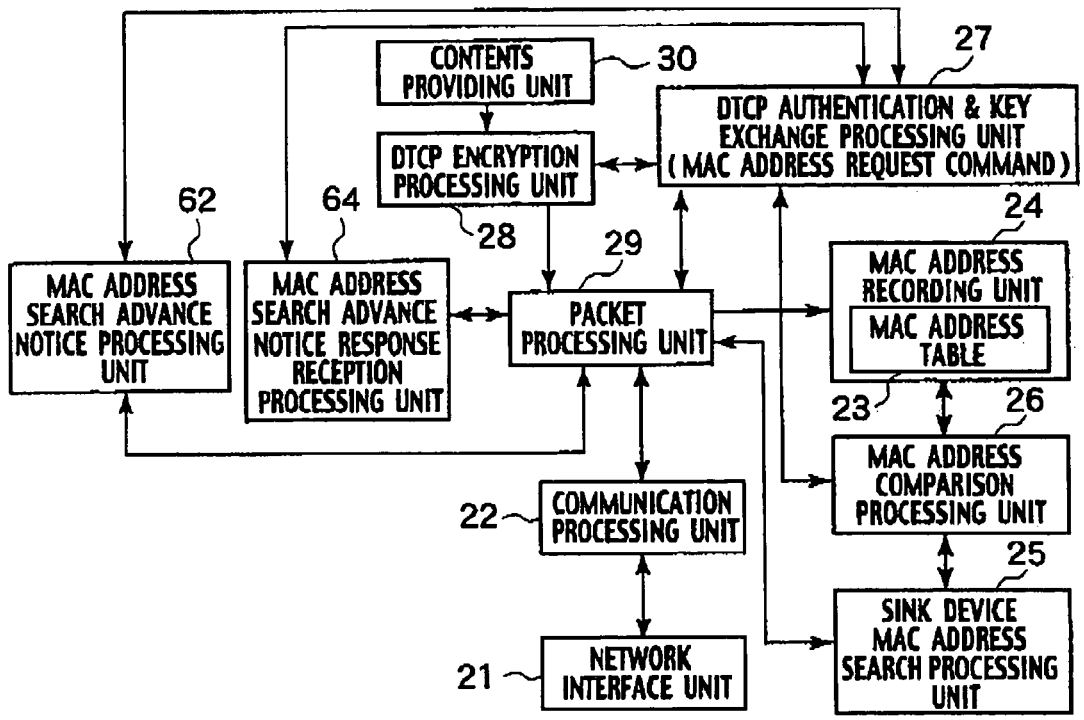
FIG. 21 is a block diagram showing an exemplary internal configuration of a source device in a contents transmission/reception system according to the fourth embodiment of the present invention.

FIG. 21 shows an internal configuration of the source device in the fourth embodiment. The source device of FIG. 21 has a MAC address search advance notice response reception processing unit 64 for judging whether the MAC address search advance notice response from the sink device has received or not, in addition to the configuration of the source device shown in FIG. 17.

Figure 22:
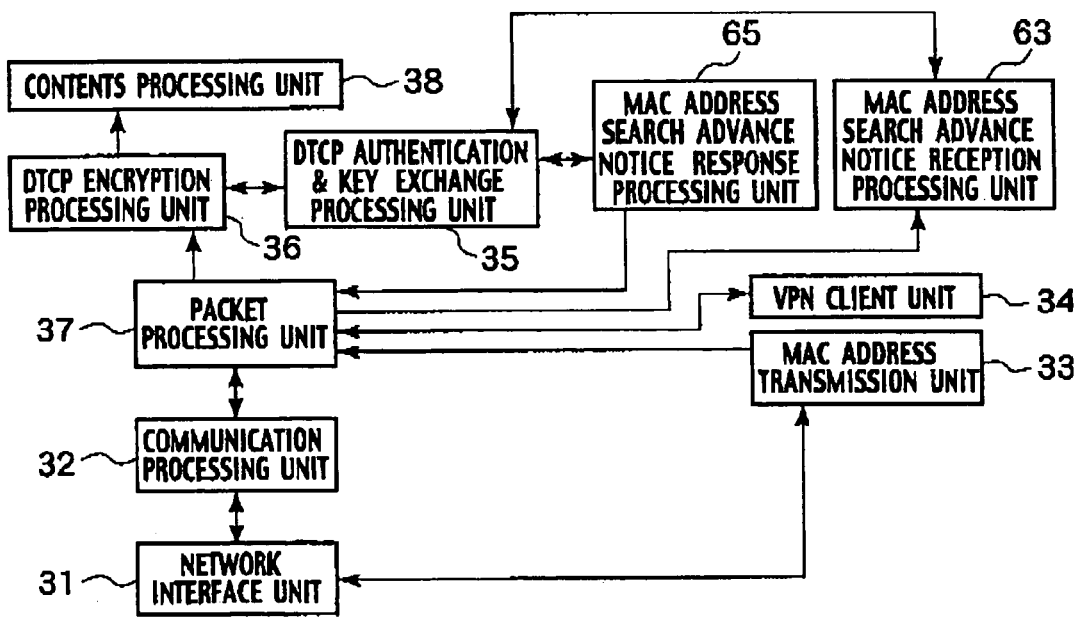
FIG. 22 is a block diagram showing an exemplary internal configuration of a sink device in a contents transmission/reception system according to the fourth embodiment of the present invention.

FIG. 22 shows an internal configuration of the sink device in the fourth embodiment. The sink device of FIG. 22 has a MAC address search advance notice response processing unit 65 for carrying out control to transmit to the source device the MAC address search advance notice response which is a response to the MAC address search advance notice from the source device, in addition to the configuration of the sink device shown in FIG. 18.

Figure 23:
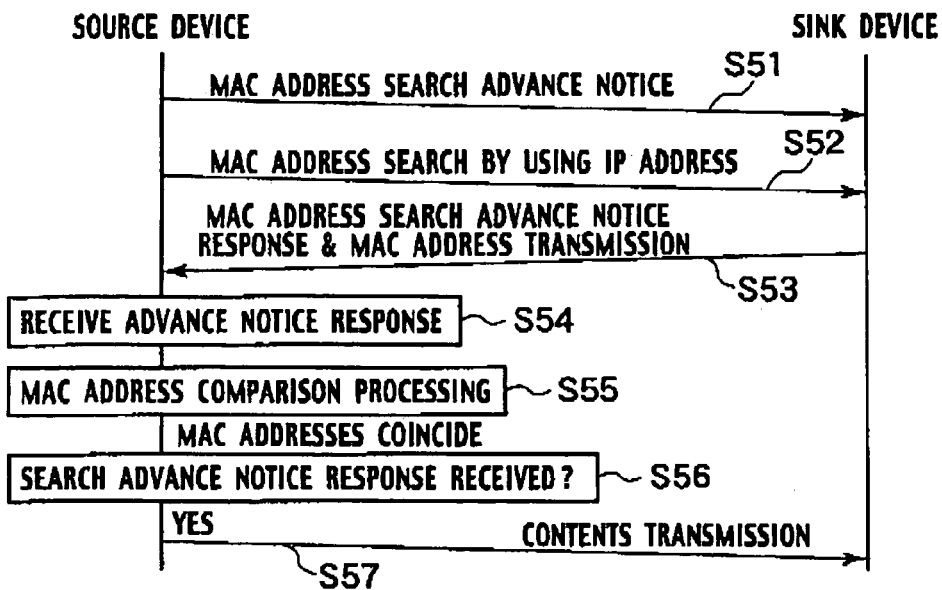
FIG. 23 is a sequence chart showing one processing procedure of a contents transmission/reception system according to the fourth embodiment of the present invention in the case where a source device and a sink device are physically existing in an identical segment.

FIG. 23 shows a processing procedure in the fourth embodiment, which is a processing procedure in the case where the source device and the sink device are physically existing in the identical segment (the case where the source device B 51 and the sink device C 52 shown in FIG. 8 carry out communications, for example). Here again, in order to simplify the explanation, it is assumed that the DTCP authentication and key exchange has succeeded and the source device has acquired the MAC address of the sink device by another method, similarly as in the cases of FIG. 19 and FIG. 20.

First, the source device transmits the message for requesting the search of the MAC address by using the IP address and the MAC address search advance notice to the sink device (steps S51 and S52). Note that these messages may be transmitted simultaneously or separately.

The sink device transmits a message containing its own MAC address and the search advance notice response to the source device as a response to the MAC address search request (step S53). This search advance notice response can be transmitted by the upper level protocol of the Ethernet (by the IP packet, for example). Also, the search advance notice response message may contain the MAC address of the search request source or the search result transmission target.

The source device receives the MAC address and the search advance notice response message as a response to the MAC address search request (step S54). Note that the sink device may attach the signature and the timestamp in order to indicate that this message is not altered, and the source device may carry out the processing for verifying the signature.

The source device carries out the processing for comparing the MAC address received as a result of the MAC address search request and the MAC address acquired in advance as a result of the MAC address request (step S65). Here, the MAC addresses coincide so that the comparison processing succeeds.

Also, the source device carries out the processing for checking whether the search advance notice response has received or not (step S56). In this checking processing, if the search advance notice response message from the sink device has received, the processing will be continued, whereas if it has not received, the processing will be interrupted. Here, the MAC address search advance notice response has received at the step S54, so that this checking processing succeeds and the Transmission of the contents will be started (step S57).

Note that, in the case where the timestamp is contained in the search advance notice response message, it is also possible to check that the value T1 of the timestamp is after the time T0 at which the MAC address search advance notice was sent by the source device and before the time T2 at which the MAC address was received.

Figure 24:
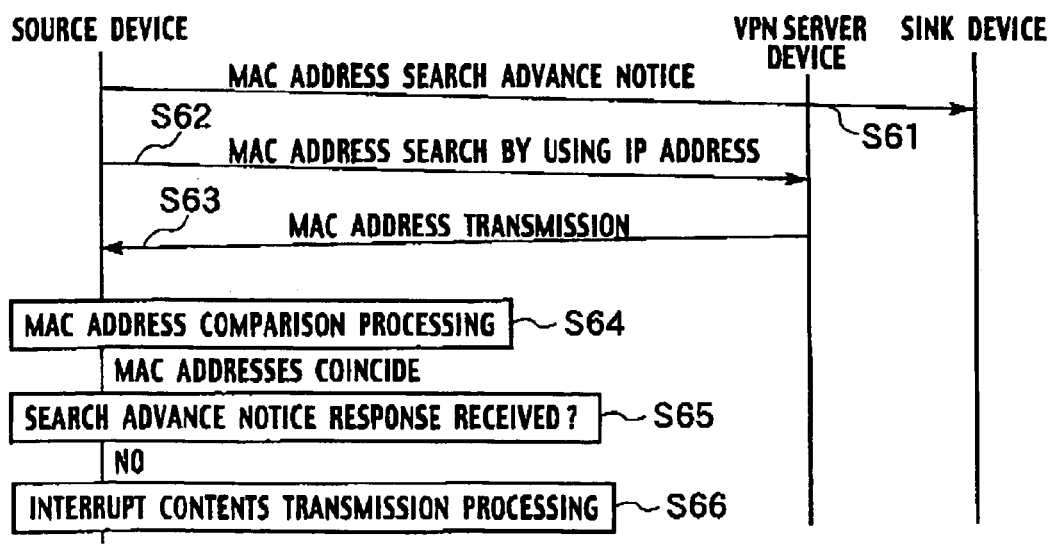
FIG. 24 is a sequence chart showing another processing procedure of a contents transmission/reception system according to the fourth embodiment of the present invention in the case where a source device and a sink device are not physically existing in an identical segment.

FIG. 24 shows a processing procedure in the fourth embodiment in the case where the source device and the sink device are not physically existing in the identical segment (the case where the source device B 51 and the sink device A 56 shown in FIG. 8 carry out communications, for example).

First, the source device transmits the MAC address search request and the MAC address search advance notice to the sink device (steps S61 and S62). The MAC address search advance notice is transmitted by the upper level protocol of the Ethernet, so that the sink device receives the MAC address search advance notice. However, as far as the MAC address search request is concerned, the sink device is not physically connected to the identical Ethernet segment SD that the VPN server device makes a response as a proxy (step S63) and the sink device cannot receive this search request. For this reason, the sink device will never transmit the MAC address search response and the MAC address search advance notice response to the source device.

On the other hand, the source device receives the MAC address from the VPN server device. Here, if the MAC address of the VPN server device and the MAC address of the sink device coincide, the MAC address comparison processing at the source device succeeds (step S64). However, the search advance notice response has not received, so that the checking processing fails (step S65), and the source device interrupts the contents transmission (step S66).

What requires attention here is that the message for requesting the search of the MAC address by using the IP address is transmitted not only by the source device but also by the general router device or the like. For this reason the sink device cannot ascertain the MAC address search advance notice response for responding to which request message should be transmitted to the source device. Consequently, by transmitting the IP address or the MAC address of the source device or both by the MAC address search advance notice, it becomes possible for the sink device to judge that the MAC address search advance notice response for responding to the request message transmitted from a specific IP address or MAC address should be transmitted.

In this way, in the fourth embodiment, the MAC address search advance notice is transmitted from the source device to the sink device by the method which is not the Ethernet, so that even if the router device or the VPN device that has the same MAC address as the sink device exists between the source device and the sink device, it is possibly for the sink device to accurately judge whether it is connected to the identical segment as the source device or not according to whether a response to this notice has received, and therefore it is possible to realize the copyright protection for the contents.

Also, this MAC address search advance notice and its response are used for the purpose of the copyright protection of the contents, and the placing of a device for transmitting a forged response to the MAC address search advance notice in order to cause an error in the judgement can be regarded as an intentional placing for the purpose of evading the copyright protection of the contents.

Note that, in the above, it has been assumed that the MAC address search advance notice and the MAC address search advance notice response use the upper level protocol of the Ethernet, but they may be defined as one of a group of commands defined by the DTCP. In this case, the MAC address search advance notice and the MAC address search advance notice response can be made as parts of the DTCP authentication and key exchange processing, so that it is possible to simplify the device configurations.

(Fifth Embodiment)

The fourth embodiment described above is directed to the configuration in which the source device transmits the MAC address search advance notice to the sink device and the sink device transmits the MAC address search advance notice response to the source device. In contrast, the fifth embodiment is directed to the configuration in which the sink device transmits the MAC address search advance notice to the source device and the source device transmits the MAC address search advance notice response to the sink device.

Figure 25:
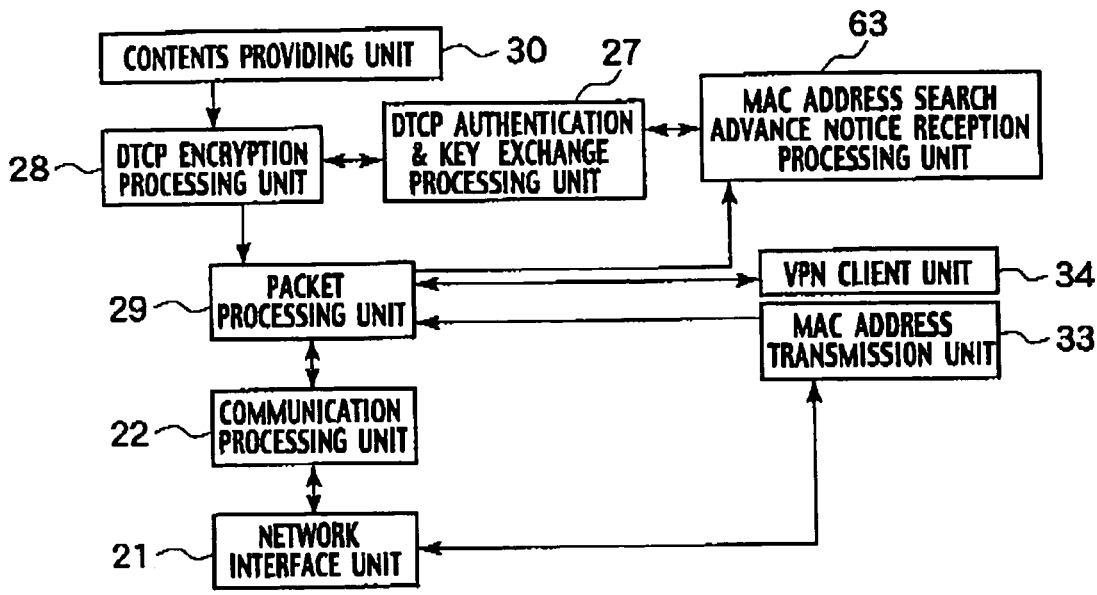
FIG. 25 is a block diagram showing an exemplary internal configuration of a source device in a contents transmission/reception system according to the fifth embodiment of the present invention.

FIG. 25 shows an internal configuration of the source device in the fifth embodiment. The source device of FIG. 25 has a configuration in which the MAC address recording unit 24, the MAC address search processing unit 25 and the MAC address comparison processing unit 26 are omitted from the source device of FIG. 17 while the MAC address search advance notice reception processing unit 63, the VPN client unit 34 and the MAC address transmission unit 33 similar to those of the sink device of FIG. 18 are added.

Figure 26:
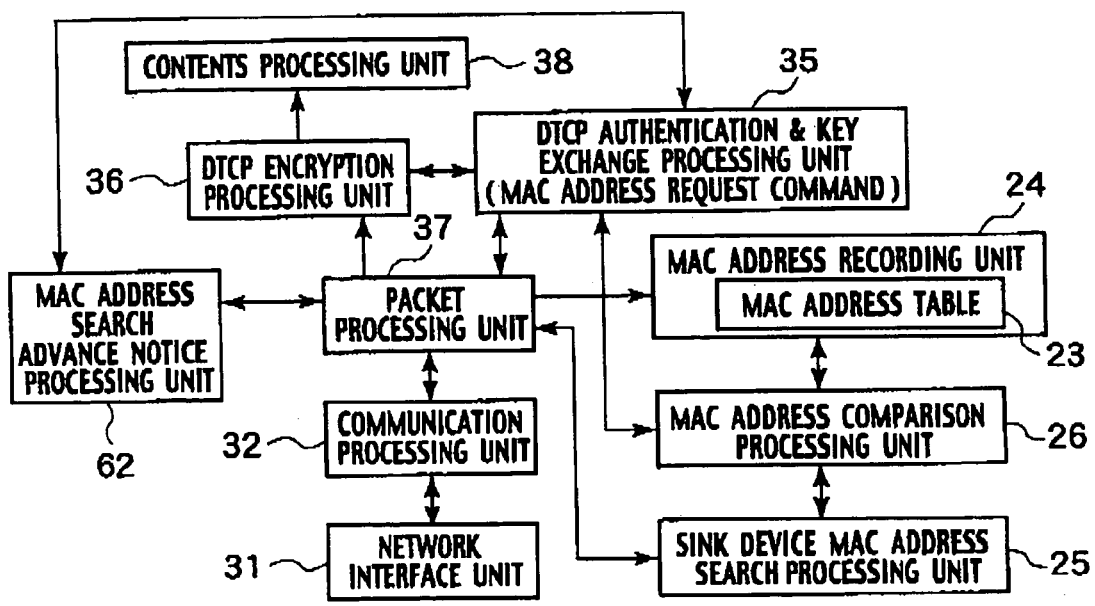
FIG. 26 is a block diagram showing an exemplary internal configuration of a sink device in a contents transmission/reception system according to the fifth embodiment of the present invention.

FIG. 26 shows an internal configuration of the sink device in the fifth embodiment. The sink device of FIG. 26 has a configuration in which the MAC address search advance notice reception processing unit 63, the VPN client unit 34 and the MAC address transmission unit 33 are omitted from the sink device of FIG. 18 while the MAC address recording unit 24, the MAC address search processing unit 25, the MAC address comparison processing unit 26, and the MAC address search advance notice processing unit 62 similar to those of the source device of FIG. 17 are added.

Figure 27:
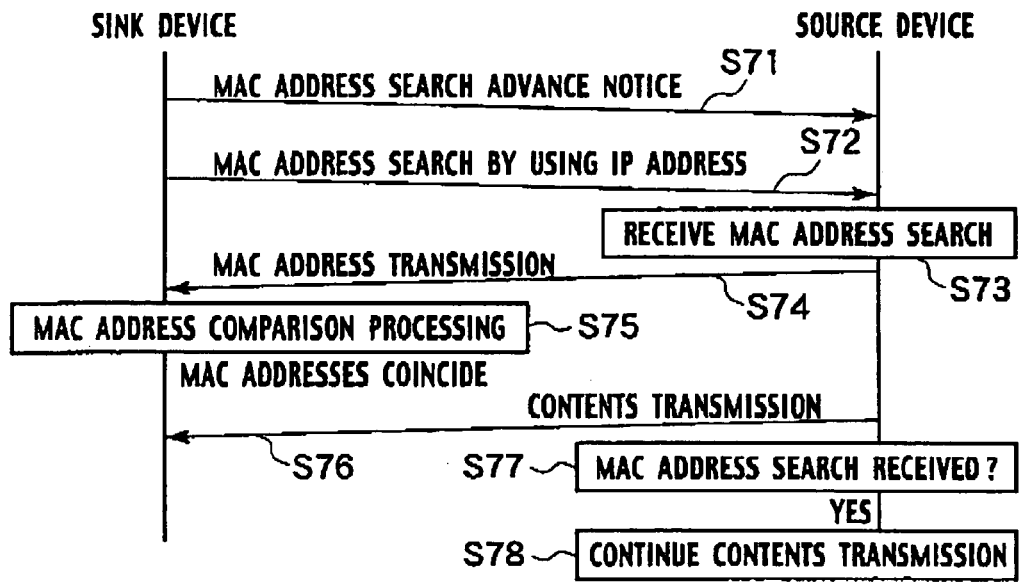
FIG. 27 is a sequence chart showing one processing procedure of a contents transmission/reception system according to the fifth embodiment of the present invention in the case where a source device and a sink device are physically existing in an identical segment.

FIG. 27 shows a processing procedure in the fifth embodiment in the case where the source device and the sink device are physically existing in the identical segment. Note that, as a prerequisite for starting the processing of FIG. 27, it is assumed that the DTCP authentication and key exchange has carried out between the sink device and the source device and the sink device has acquired the MAC address of the source device in advance.

First, the sink device transmits the MAC address search request and the MAC address search advance notice to the source device (step S71), and carries out the MAC address search by using the IP address of the source device (step S72).

Upon receiving the MAC address search request from the sink device (step S73), the source device transmits its own MAC address to the sink device (step S74).

The sink device carries out the processing for comparing the MAC address transmitted from the source device and the MAC address of the source device acquired in advance to see whether they coincide or not (step S75), and if they coincide, the sink device receives the contents from the source device (step S76).

The source device carries out the processing for checking whether the MAC address search request from the sink device has received or not (step S77), if it has received, the source device continues the contents reception (step S78), whereas if it has not received, a prescribed error processing is carried out and the contents reception is interrupted.

Figure 28:
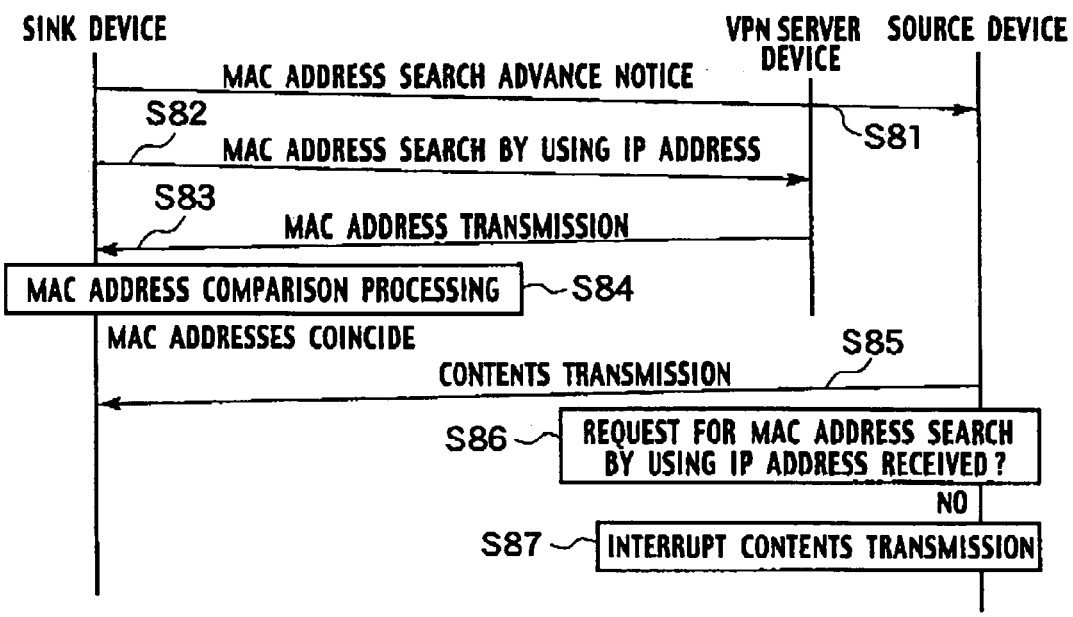
FIG. 28 is a sequence chart showing another processing procedure of a contents-transmission/reception system according to the fifth embodiment of the present invention in the case where a source device and a sink device are not physically existing in an identical segment.

FIG. 28 shows a processing procedure in the fifth embodiment in the case where the source device and the sink device are not physically existing in the identical segment. In this case, the source device is not physically connected to the identical segment as the sink device, the MAC address search advance notice transmitted by the method which is not the Ethernet from the sink device reaches to the source device (step S81), but even if the search of the MAC address by using the IP address of the source address is attempted (step S82), the VPN server device makes a response as a proxy (step S83).

If the MAC address of the VPN server device and the MAC address of the source device are identical, the MAC address comparison processing at the sink device succeeds (step S84), and the source device transmits the contents to the sink device (step S85).

However, the source device has not received the MAC address search request (step S86), so that the contents transmission is interrupted (step S87).

In this way, in the fifth embodiment, the contents transmission can be interrupted surely as long as the source device is not connected to the identical segment, even if the MAC address of the VPN server device that is connected to the identical segment as the sink device is identical to the MAC address of the source device.

(Sixth Embodiment)

Figure 29:
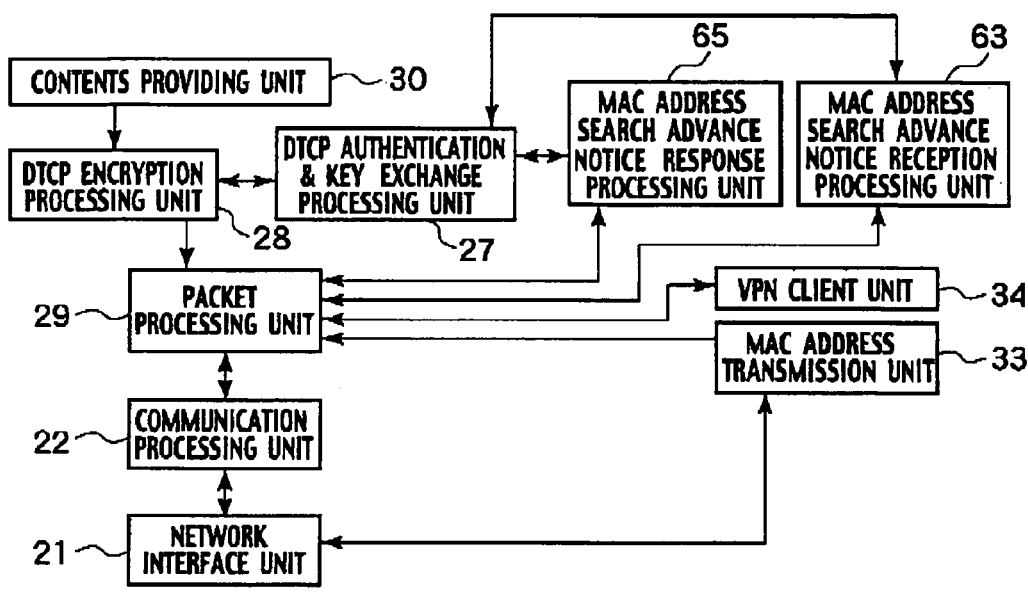
FIG. 29 is a block diagram showing an exemplary internal configuration of a source device in a contents transmission/reception system according to the sixth embodiment of the present invention.

The sixth embodiment is directed to the case in which, upon receiving the MAC address search advance notice from the sink device, the source device transmits a response to it to the sink device, in the configuration of the fifth embodiment, FIG. 29 shows an internal configuration of the source device in the sixth embodiment. The source device of FIG. 29 has the MAC address search advance notice response processing unit 65 for carrying out control to transmit the MAC address search advance notice response to the sink device, in addition to the configuration of the source device of FIG. 25.

Figure 30:
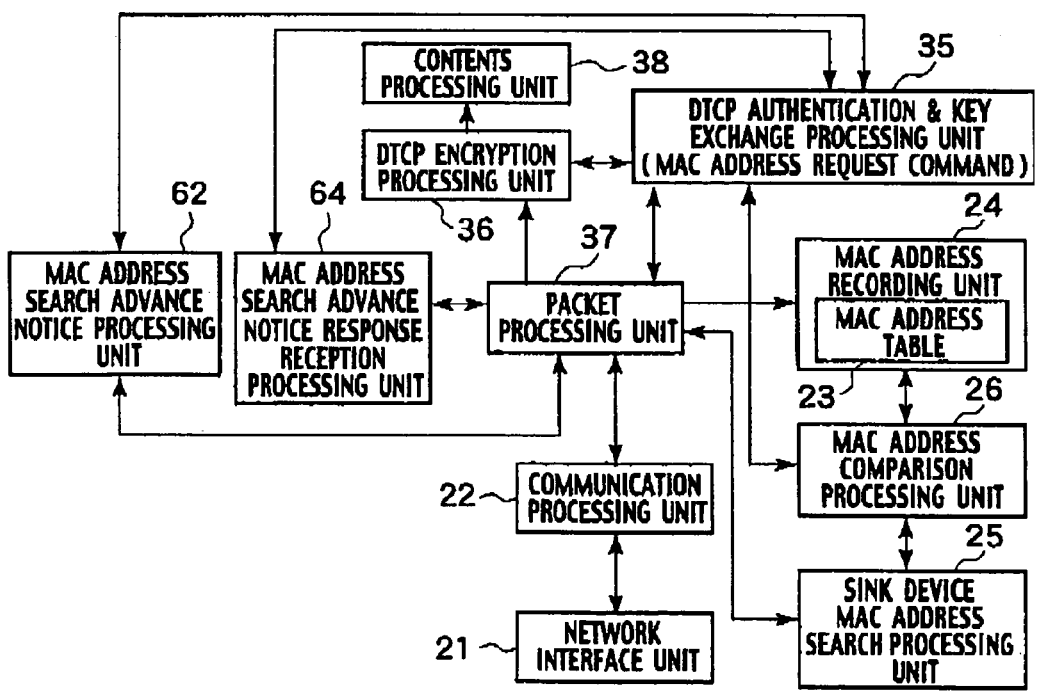
FIG. 30 is a block diagram showing an exemplary internal configuration of a sink device in a contents transmission/reception system according to the sixth embodiment of the present invention.

FIG. 30 shows an internal configuration of the sink device in the sixth embodiment. The sink device of FIG. 30 has the MAC address search advance notice response reception processing unit 64 for carrying out control to receive the MAC address search advance notice response from the source address, in addition to the configuration of the sink device of FIG. 26.

Figure 31:
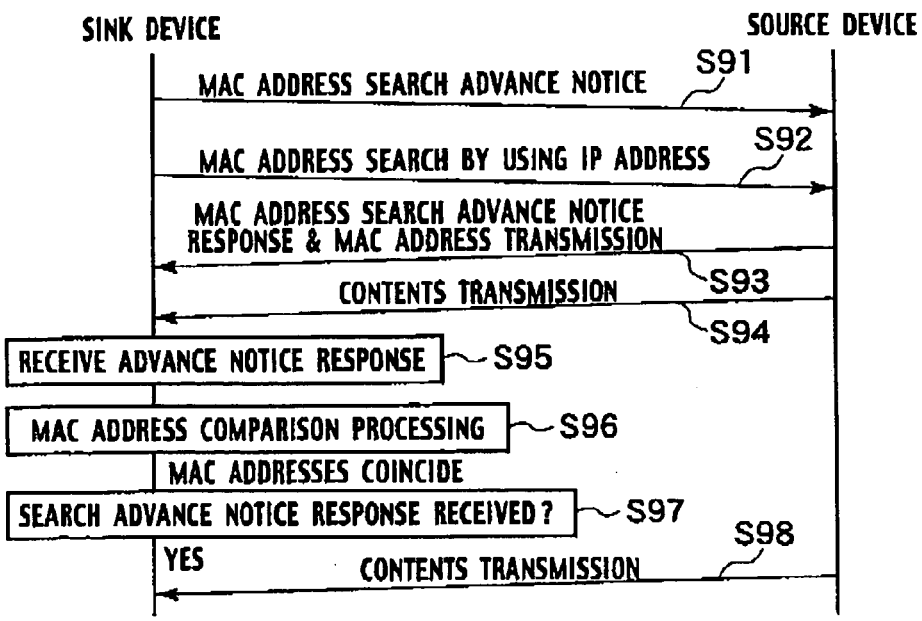
FIG. 31 is a sequence chart showing one processing procedure of a contents transmission/reception system according to the sixth embodiment of the present invention in the case where a source device and a sink device are physically existing in an identical segment.

FIG. 31 shows a processing procedure in the sixth embodiment in the case where the source device and the sink device are physically existing in the identical segment. Note that, as a prerequisite for starting the processing of FIG. 31, it is assumed that the DTCP authentication and key exchange has carried out between the sink device and the source device, and the sink device has acquired the MAC address of the source device in advance. In the following, the difference from the case of FIG. 27 will be mainly described.

When the source device receives the MAC address search advance notice from the sink device (step S91), the source device transmits a response to it (the MAC address search advance notice response) to the sink device (step S93).

The sink device receives the MAC address search advance notice response from the source device (step S95), and carries out the MAC address comparison processing (step S96). Then, the sink device judges whether the MAC address search advance notice response has received or not (step S97), and if it has received, the sink device receives the contents transmitted from the source device (step S98).

Figure 32:
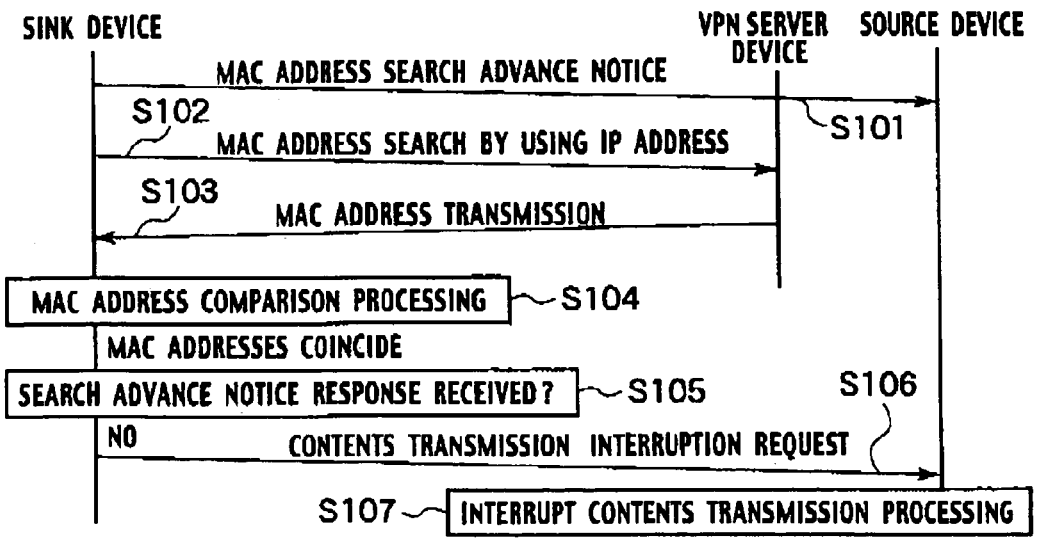
FIG. 32 is a sequence chart showing another processing procedure of a contents transmission/reception system according to the sixth embodiment of the present invention in the case where a source device and a sink device are not physically existing in an identical segment.
Figure 33:
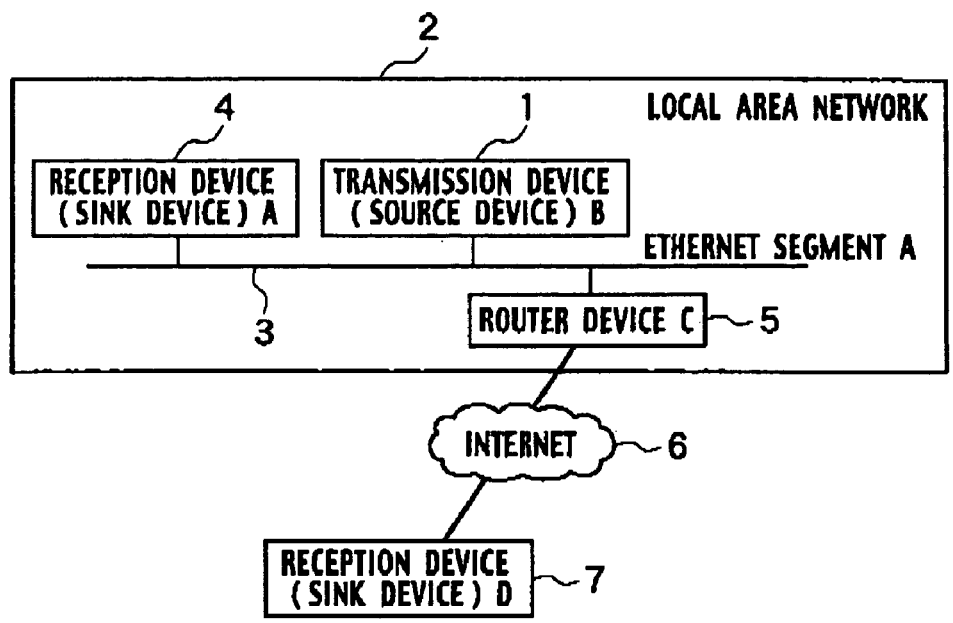
FIG. 33 is a block diagram showing an overall configuration of a conventional network system having a transmission device and a reception device.
Figure 34:
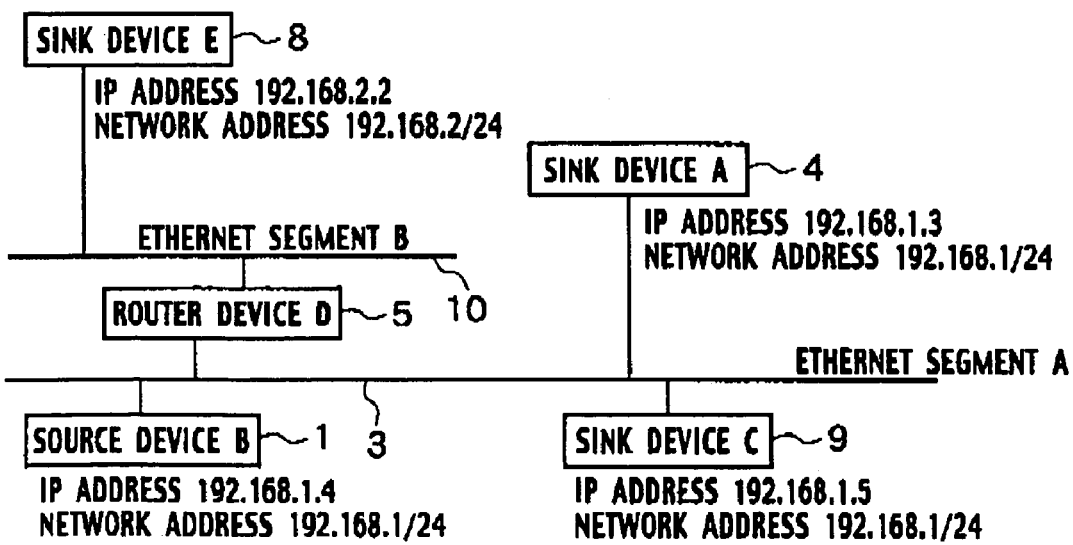
FIG. 34 is a block diagram showing an overall configuration of a conventional network system in which different sink devices are connected to Ethernet segments A and B.
Figure 35:
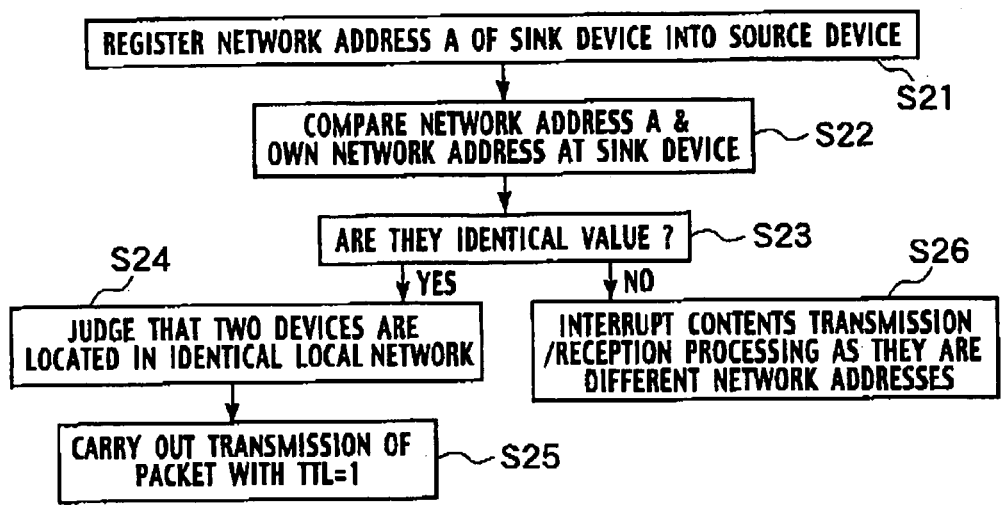
FIG. 35 is a flow chart showing a processing procedure for judging whether network addresses of a source device and a sink device are identical or not in the conventional network system of FIG. 34.
Figure 36:
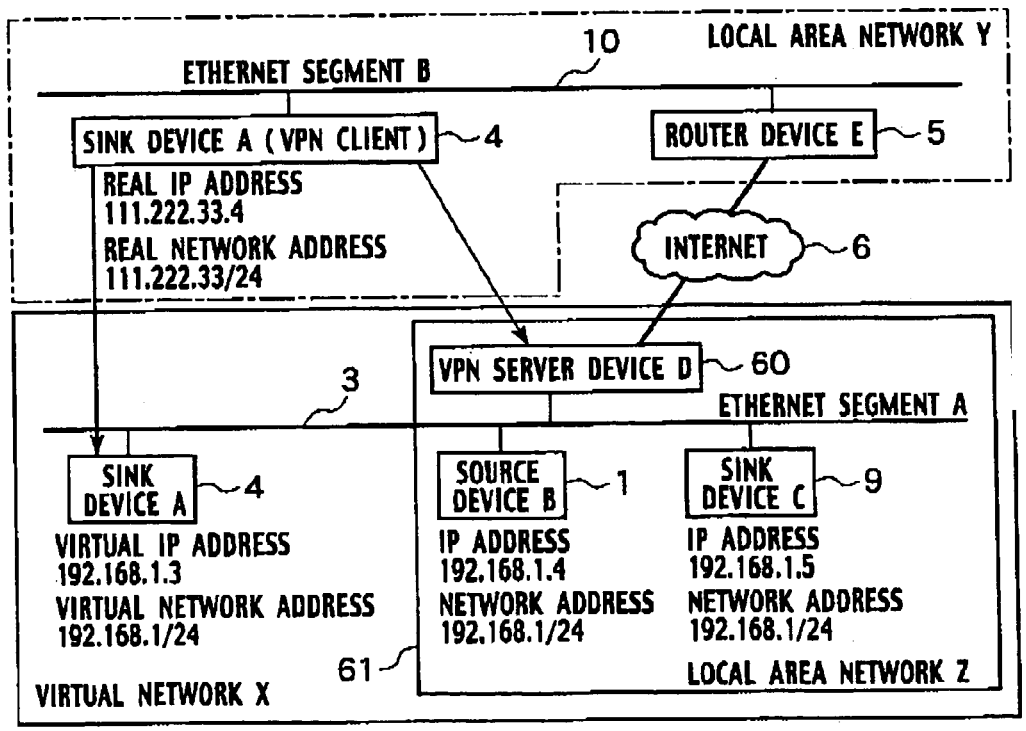
FIG. 36 is a block diagram showing an exemplary configuration of a conventional network system using VPN.

FIG. 32 shows a processing procedure in the sixth embodiment in the case where the source device and the sink device are not physically existing in the identical segment. The sink device transmits the MAC address search advance notice by using the method which is not the Ethernet to the source device (step S101), so that the source device can receive this notice, but when the MAC address search by using the IP address of the source address is carried out by the sink device (step S102), the VPN server device that is located in the identical segment as the sink device makes a response indicating the MAC address as a proxy (step S103).

If the MAC address of the VPN server device and the MAC address of the source device are identical, the MAC address comparison processing at the sink device succeeds (step S104), but the sink device has not received the MAC address search advance notice response fro the source device (step S105) so that the sink device requests the interruption of the contents transmission to the source device (step S106) and the source device interrupts the contents transmission (step S107).

In this way, in the sixth embodiment, the contents transmission is carried out only when the response to the MAC address search advance notice transmitted from the sink device to the source device is received by the sink device, so that it is possible to carry our the contents transmission only in the case where the sink device and the source device are located in the identical segment.

As described above, according to the present invention, the transmission of the contents to the corresponding reception device is permitted only in the case where the device identification information searched out by the device identification information searching unit and the device identification information registered by the device identification information registration unit coincide, so that it is possible to provide the contents only to the limited reception devices, and it is possible to prevent the illegal reception of the contents.

In this way, it is possible to change the contents distribution conditions by distinguishing the reception device physically connected to the identical sub-net and the reception devices virtually connected to the identical sub-net among a plurality of reception devices of the same sub-net.

Also, according to the present invention, by checking whether the device identification information search request from the transmission device has received by the reception device or not, it is possible to judge whether the transmission device and the reception device are connected to the identical segment or not easily and accurately.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A contents transmission/reception system, comprising:
   a transmission device; and
   at least one reception device that receives contents from the transmission device;
   wherein the transmission device and the reception device are physically connected to an identical local area network, or are not physically connected to the identical local area network but virtually existing in an identical sub-net, the transmission device has:
- an authentication and key exchange processing unit configured to carry out an authentication and key exchange processing with a reception device that made a contents transmission request;
- a device identification information transmission request unit configured to transmit a device identification information request to the reception device, such that the reception device transmits a device identification information;
- a device identification information registration unit configured to register the device identification information transmitted from the reception device by an upper level protocol above a network layer;
- a device identification information search unit configured to search out the device identification information corresponding to an IP (Internet Protocol) address of the reception device by a protocol on the network layer, from a network to which the reception device is connected:
- a comparison judgement unit configured to judge whether the device identification information searched out by the device identification information search unit and the device identification information registered by the device identification information registration unit coincide or not; and
- a distribution condition determination unit configured to change a distribution condition for contents to be transmitted to the reception device that made the contents transmission request, according to a judgement result obtained by the comparison judgement unit; and the reception device has:
- a contents transmission request unit configured to make the contents transmission request to the transmission device; and
- a device identification information transmission unit configured to transmit the device identification information of the reception device to the transmission device, upon receiving the device identification information request from the transmission device.

2. The contents transmission/reception system of claim 1, wherein the device identification information is a MAC address of a network interface, and the device identification information search unit transmits a MAC address search request by using an IP address of the reception device as a key to a network segment to which the reception device is connected, and receives a MAC address search result.

3. The contents transmission/reception system of claim 2, wherein the device identification information search unit searches out the MAC address corresponding to the IP address of the reception device by an ARP (Address Resolution Protocol).

4. The contents transmission/reception system of claim 2, wherein the device identification information transmission unit transmits the MAC address to the transmission device by attaching an electronic signature.

5. The contents transmission/reception system of claim 4, further comprising a verification unit configured to verify whether the MAC address is altered or not, when the electronic signature is attached to the MAC address;
wherein the device identification information registration unit registers the MAC address only when the verification unit judges that the MAC address is not altered.

6. The contents transmission/reception system of claim 1, wherein the authentication and key exchange processing unit carries out the authentication and key exchange processing according to a DTCP (Digital Transmission Contents Protection).

7. The contents transmission/reception system of claim 1, wherein the reception device also has:
- a reception device side authentication and key exchange processing unit configured to carry out the authentication and key exchange processing with the transmission device;
- a network interface unit configured to receive encrypted contents from the transmission device; and
- an encryption processing unit configured to decrypt the encrypted contents received by the network interface unit, by using a key exchanged by the reception device side authentication and key exchange processing unit.

8. A contents transmission device for transmitting contents to at least one reception device, the contents transmission device and the reception device being physically connected to an identical local area network, or being not physically connected to the identical local area network but virtually existing in an identical sub-net, the contents transmission device comprising:
- an authentication and key exchange processing unit configured to carry out an authentication and key exchange processing with a reception device that made a contents transmission request;
- a device identification information transmission request unit configured to transmit a device identification information request to the reception device, such that the reception device transmits a device identification information;
- a device identification information registration unit configured to register the device identification information transmitted from the reception device by an upper level protocol above a network layer;
- a device identification information search unit configured to search out the device identification information corresponding to an IP (Internet Protocol) address of the reception device by a protocol on the network layer, from a network to which the reception device is connected;
- a comparison judgement unit configured to judge whether the device identification information searched out by the device identification information search unit and the device identification information registered by the device identification information registration unit coincide or not; and
- a distribution condition determination unit configured to change a distribution condition for contents to be transmitted to the reception device that made the contents transmission request, according to a judgement result obtained by the comparison judgement unit.

9. A contents transmission/reception system, comprising:
a transmission device; and
at least one reception device that receives contents from the transmission device;
wherein the transmission device and the reception device are physically connected to an identical local area network, or are not physically connected to the identical local area network but virtually existing in an identical sub-net, a reception device has:
- a contents transmission request unit configured to make a contents transmission request to the transmission device;
- a first authentication and key exchange processing unit configured to carry out an authentication and key exchange processing with the transmission device to which the contents transmission request is made;

a device identification information transmission request unit configured to transmit a device identification information request to the transmission device, such that the transmission device transmits a device identification information;

a device identification information registration unit configured to register the device identification information transmitted from the transmission device by an upper level protocol above a network layer;

a device identification information search unit configured to search out the device identification information corresponding to an IP (Internet Protocol) address of the transmission device by a protocol on the network layer, from a network to which the transmission device is connected:

a comparison judgement unit configured to judge whether the device identification information searched out by the device identification information search unit and the device identification information registered by the device identification information registration unit coincide or not; and a reception condition determination unit configured to determine a reception condition for contents to be transmitted from the transmission device to which the contents transmission request is made, according to a judgement result obtained by the comparison judgement unit and the transmission device has:

a device identification information transmission unit configured to transmit the device identification information of the transmission device to the reception device, upon receiving the device identification information request from the reception device;

a second authentication and key exchange processing unit configured to carry out an authentication and key exchange processing with the reception device that made the contents transmission request; and a contents transmission control unit configured to carry out contents transmission control according to the reception condition determined by the reception condition determination unit.

10. A contents reception device for receiving contents from a transmission device, the contents retention device and the transmission device being physically connected to an identical local area network or being not physically connected to the identical local area network but virtually existing in an identical sub-net, the contents reception device comprising:

a contents transmission request unit configured to make a contents transmission request to the transmission device;

an authentication and key exchange processing unit configured to carry out an authentication and key exchange processing with the transmission device to which the contents transmission request is made;

a device identification information transmission request unit configured to transmit a device identification information request to the transmission device, such that the transmission device transmits a device identification information;

a device identification information registration unit configured to register the device identification information transmitted from the transmission device by an upper level protocol above a network layer;

a device identification information search unit configured to search out the device identification information corresponding to an IP (Internet Protocol) address of the transmission device by a protocol on the network layer, from a network to which the transmission device is connected:

a comparison judgement unit configured to judge whether the device identification information searched out by the device identification information search unit and the device identification information registered by the device identification information registration unit coincide or not; and a reception condition determination unit configured to determine a reception condition for contents to be transmitted from the transmission device to which the contents transmission request is made, according to a judgement result obtained by the comparison judgement unit.

11. A contents transmission/reception system, comprising:

a transmission device; and at least one reception device that receives contents from the transmission device;

wherein the transmission device and the reception device are physically connected to an identical local area network or are not physically connected to the identical local area network but virtually existing in an identical sub-net, the transmission device has:

a device identification information transmission request unit configured to transmit a device identification information request to a reception device that made a contents transmission request, such that the reception device transmits a device identification information;

a device identification information registration unit configured to register the device identification information transmitted from the reception device by an upper level protocol above a network layer;

an advance notice unit configured to make a device identification information search advance notice, to the reception device;

a device identification information search unit configured to search out the device identification information corresponding to an IP (Internet Protocol) address of the reception device by a protocol on the network layer, from a network to which the reception device is connected;

a comparison judgement unit configured to judge whether the device identification information searched out by the device identification information search unit and the device identification information registered by the device identification information registration unit coincide or not;

a request response reception judgement unit configured to judge whether a response to the device identification information search advance notice is received or not; and a distribution condition determination unit configured to determine a distribution condition for contents to be transmitted to the reception device that made the contents transmission request, according to judgement results obtained by the comparison judgement unit and the request response reception judgement unit; and the reception device has:

a device information transmission unit configured to transmit the device identification information of the reception device and a device identification information search advance notice response to the transmission device, upon receiving the device identification information request from the transmission device.

12. The contents transmission/reception system of claim 11, wherein the reception device also has:
a device identification information search judgement unit configured to judge whether the device identification information search request from the transmission device is received or not; and
a contents reception control unit configured to prohibit reception of contents from the transmission device when the device identification information search judgement unit judges that the device identification information search request is not received.

13. A contents transmission device for transmitting contents to at least one reception device, the contents transmission device and the reception device being physically connected to an identical local area network, or being not physically connected to the identical local area network but virtually existing in an identical sub-net, the contents transmission device comprising:
a device identification information transmission request unit configured to transmit a device identification information request to a reception device that made a contents transmission request, such that the reception device transmits a device identification information;
a device identification information registration unit configured to register the device identification information transmitted from the reception device by an upper level protocol above a network layer;
an advance notice unit configured to make a device identification information search advance notice, to the reception device;
a device identification information search unit configured to search out the device identification information corresponding to an IP (Internet Protocol) address of the reception device by a protocol on the network layer, from a network to which the reception device is connected:
a comparison judgement unit configured to judge whether the device identification information searched out by the device identification information search unit and the device identification information registered by the device identification information registration unit coincide or not;
a request response reception judgement unit configured to judge whether a response to the device identification information search advance notice is received or not; and
a distribution condition determination unit configured to determine a distribution condition for contents to be transmitted to the reception device that made the contents transmission request, according to judgement results obtained by the comparison judgement unit and the request response reception judgement unit.

14. A contents transmission/reception system, comprising:
a transmission device; and
at least one reception device that receives contents from the transmission device;
wherein the transmission device and the reception device are physically connected to an identical local area network or are not physically connected to the identical local area network but virtually existing in an identical sub-net,
the transmission device has:
a device identification information search judgement unit configured to judge whether a device identification information search request from a reception device is received or not; and
a contents transmission control unit configured to prohibit transmission of contents to the reception device when the device identification information search judgement unit judges that the device identification information search request is not received; and
the reception device has:
a contents transmission request unit configured to make a contents transmission request to the transmission device;
an authentication and key exchange processing unit configured to carry out an authentication and key exchange processing with the transmission device to which the contents transmission request is made;
a device identification information transmission request unit configured to transmit the device identification information request to the transmission device, such that the transmission device transmits a device identification information;
a device identification information registration unit configured to register the device identification information transmitted from the reception device by an upper level protocol above a network layer;
an advance notice unit configured to make a device identification information search advance notice, to the transmission device;
a device identification information search unit configured to search out the device identification information corresponding to an IP (Internet Protocol) address of the transmission device by a protocol on the network layer, from a network to which the transmission device is connected;
a comparison judgement unit configured to judge whether the device identification information searched out by the device identification information search unit and the device identification information registered by the device identification information registration unit coincide or not; and
a reception condition determination unit configured to determine a reception condition for contents to be transmitted form the transmission device to which the contents transmission request is made, according to a judgement result obtained by the comparison judgement unit.

15. A contents reception device for receiving contents from a transmission device, the contents reception device and the transmission device being physically connected to an identical local area network or being not physically connected to the identical local area network but virtually existing in an identical sub-net, the contents reception device comprising:
a contents transmission request unit configured to make a contents transmission request to the transmission device;
an authentication and key exchange processing unit configured to carry out an authentication and key exchange processing with the transmission device to which the contents transmission request is made;
a device identification information transmission request unit configured to transmit a device identification information request to the transmission device, such that the transmission device transmits a device identification information;

a device identification information registration unit configured to register the device identification information transmitted from the reception device by an upper level protocol above a network layer;

an advance notice unit configured to make a device identification information search advance notice, to the transmission device;

a device identification information search unit configured to search out the device identification information corresponding to an IP (Internet Protocol) address of the transmission device by a protocol on the network layer, from a network to which the transmission device is connected;

a comparison judgement unit configured to judge whether the device identification information searched out by the device identification information search unit and the device identification information registered by the device identification information registration unit coincide or not; and a reception condition determination unit configured to determine a reception condition for contents to be transmitted form the transmission device to which the contents transmission request is made, according to a judgement result obtained by the comparison judgement unit.

* * * * *